US012698196B2

(12) United States Patent (10) Patent No.: US 12,698,196 B2

Sankaran et al. (45) Date of Patent: Aug. 4, 2026

(54) DISPENSING CONTROL SYSTEM FOR ACCOMMODATING PERSONS WITH DISABILITIES AND METHOD

(71) Applicant: Bunn Commercial LP, Springfield, IL (US)

(72) Inventors: Prashanth Sankaran, Springfield, IL (US); Greg Miller, Springfield, IL (US)

(73) Assignee: Bunn Commercial LP, Springfield, IL (US)

( * ) Notice: Subject to any disclaimer, the term of this patent is extended or adjusted under 35 U.S.C. 154(b) by 648 days.

(21) Appl. No.: 17/351,712

(22) Filed: Jun. 18, 2021

(65) Prior Publication Data

US 2021/0395070 A1 Dec. 23, 2021

Related U.S. Application Data

(60) Provisional application No. 63/041,290, filed on Jun. 19, 2020.

(51) Int. Cl.
B67D 1/08 (2006.01)
A47J 31/52 (2006.01)
(Continued)

(52) U.S. Cl.
CPC .......... B67D 1/0888 (2013.01); A47J 31/521 (2018.08); G05B 19/4155 (2013.01);
(Continued)

(58) Field of Classification Search
None
See application file for complete search history.

(56) References Cited

U.S. PATENT DOCUMENTS

| | | | |
|---|---|---|---|
| 5,350,082 A | 9/1994 | Kiriakides, Jr. et al. | |
| 5,491,463 A | 2/1996 | Sargeant | |

(Continued)

FOREIGN PATENT DOCUMENTS

| | | | |
|---|---|---|---|
| CN | 106264149 | 1/2017 | |
| CN | 107067556 | 8/2017 | |

(Continued)

OTHER PUBLICATIONS

Author: Josh Grisdale. Title: A Wheelchair Accessible Vending Machine!. Publication Date: Sep. 8, 2018. Publisher: Tabifolk. URL: https://www.tabifolk.com/a-wheelchair-accessible-vending-machine/ (Year: 2018).*

(Continued)

*Primary Examiner* — Kieu D Vu
*Assistant Examiner* — David V Luu
(74) *Attorney, Agent, or Firm* — Barnes & Thornburg LLP

(57) ABSTRACT

A dispenser that is configured to switch between a first mode in which the user interacts with external surfaces of the dispenser to make selections and initiate dispensing and a second mode in which the user makes selections and initiates dispensing using gesture controls. In some cases, the gesture control feature could be incorporated into an accessibility panel that can be retrofitted with existing dispensers to add gesture control. In some cases, the dispenser broadcasts an identifier with a wireless beacon that facilitates selection and dispensing of a product.

11 Claims, 12 Drawing Sheets

(51) Int. Cl.

| | |
|---|---|
| *G05B 19/4155* | (2006.01) |
| *G06F 3/041* | (2006.01) |
| *G06F 3/04883* | (2022.01) |
| *G06F 3/0482* | (2013.01) |
| *G06Q 20/20* | (2012.01) |
| *G06Q 20/32* | (2012.01) |

(52) U.S. Cl.
CPC ........ *G06F 3/0416* (2013.01); *G06F 3/04883* (2013.01); *G05B 2219/2645* (2013.01); *G06F 3/0482* (2013.01); *G06Q 20/204* (2013.01); *G06Q 20/3276* (2013.01); *G06Q 20/3278* (2013.01)

(56) References Cited

U.S. PATENT DOCUMENTS

| | | | |
|---|---|---|---|
| 6,587,739 | B1 | 7/2003 | Abrams |
| 7,032,818 | B2 | 4/2006 | Thomas et al. |
| 7,578,415 | B2 | 8/2009 | Ziesel et al. |
| 7,866,509 | B2 | 1/2011 | Ziesel |
| 7,881,822 | B2 | 2/2011 | Thornton et al. |
| 8,771,774 | B2 | 7/2014 | Miller |
| 8,820,580 | B2 | 9/2014 | Ziesel |
| 9,253,264 | B2 | 2/2016 | Robinson et al. |
| 9,334,150 | B1 | 5/2016 | Ost et al. |
| 9,394,154 | B2 | 7/2016 | Connerat et al. |
| 9,495,673 | B2 | 11/2016 | Cameron et al. |
| 9,646,314 | B2 | 5/2017 | Moore et al. |
| 9,701,530 | B2 | 7/2017 | Kline et al. |
| 9,713,399 | B2 | 7/2017 | Boone et al. |
| 9,721,060 | B2 | 8/2017 | Chung et al. |
| 9,764,935 | B2 | 9/2017 | Jersey et al. |
| 9,840,407 | B2 | 12/2017 | Difatta et al. |
| 9,883,377 | B2 | 1/2018 | Cheng |
| 9,910,502 | B2 | 3/2018 | Geurts et al. |
| 10,121,306 | B2 | 11/2018 | Peters et al. |
| 10,143,331 | B1 | 12/2018 | Heys et al. |
| 10,365,620 | B1 | 7/2019 | Raeber et al. |
| 10,453,461 | B1 | 10/2019 | Mutagi et al. |
| 10,579,958 | B2 | 3/2020 | Gray et al. |
| 10,602,334 | B2 | 3/2020 | Kim |
| 10,631,558 | B2 | 4/2020 | White et al. |
| 11,059,713 | B1 | 7/2021 | Connor |
| 11,084,703 | B2 | 8/2021 | Peters et al. |
| 11,087,376 | B2 | 8/2021 | Cuppari et al. |
| 2002/0011923 | A1 | 1/2002 | Cunningham |
| 2003/0079613 | A1 | 5/2003 | Williamson |
| 2003/0084047 | A1 | 5/2003 | Williamson |
| 2006/0293956 | A1 | 12/2006 | Walker et al. |
| 2007/0086514 | A1 | 4/2007 | Lawrence |
| 2010/0326562 | A1 | 12/2010 | Sheehy et al. |
| 2011/0052766 | A1 | 3/2011 | Knepler |
| 2012/0050180 | A1* | 3/2012 | King ................ G06F 3/041662<br>345/173 |
| 2012/0299862 | A1* | 11/2012 | Matsumoto ........... G06F 3/0488<br>345/173 |
| 2013/0195088 | A1 | 8/2013 | Ho |
| 2013/0275957 | A1 | 10/2013 | Villar et al. |
| 2014/0100942 | A1 | 4/2014 | Konevic |
| 2014/0263415 | A1 | 9/2014 | San Miguel et al. |
| 2014/0267094 | A1 | 9/2014 | Hwang et al. |
| 2015/0039776 | A1 | 2/2015 | Jarnagin, III |
| 2015/0082243 | A1 | 3/2015 | Taylor et al. |
| 2015/0178721 | A1 | 6/2015 | Pandiarajan |
| 2015/0297022 | A1 | 10/2015 | Guard |
| 2016/0045064 | A1 | 2/2016 | Lopez |
| 2016/0165660 | A1 | 6/2016 | Delamare |
| 2016/0224176 | A1* | 8/2016 | Kim ..................... G06F 3/0482 |
| 2016/0321447 | A1 | 11/2016 | Lancioni |
| 2016/0325980 | A1 | 11/2016 | Sawhney et al. |
| 2017/0046903 | A1 | 2/2017 | Knepler |
| 2017/0081163 | A1 | 3/2017 | Gatipon et al. |
| 2017/0099981 | A1 | 4/2017 | Haidar |
| 2017/0212645 | A1* | 7/2017 | Nakajima ............. G06F 3/0482 |

| | | | |
|---|---|---|---|
| 2017/0331899 | A1 | 11/2017 | Binder |
| 2018/0130279 | A1* | 5/2018 | Ceccaroli ............. G07F 13/065 |
| 2018/0138945 | A1 | 5/2018 | Kearney |
| 2018/0168385 | A1 | 6/2018 | Boone |
| 2018/0211235 | A1 | 7/2018 | Geigel et al. |
| 2018/0288594 | A1 | 10/2018 | Kim |
| 2019/0108709 | A1 | 4/2019 | Yamazaki et al. |
| 2019/0117011 | A1 | 4/2019 | Magatti |
| 2019/0172297 | A1 | 6/2019 | Schwarber et al. |
| 2019/0207650 | A1 | 7/2019 | Kearney |
| 2019/0259077 | A1 | 8/2019 | Cuppari et al. |
| 2019/0279181 | A1 | 9/2019 | Kelly et al. |
| 2019/0308866 | A1 | 10/2019 | Sawhney et al. |
| 2020/0031656 | A1 | 1/2020 | Rudick et al. |
| 2020/0129004 | A1 | 4/2020 | Hanes |
| 2020/0327766 | A1 | 10/2020 | Wilkinson |
| 2020/0375388 | A1 | 12/2020 | MacFarlane |
| 2021/0181892 | A1 | 6/2021 | Rudick |
| 2021/0371266 | A1 | 12/2021 | Connor |
| 2022/0269351 | A1* | 8/2022 | Wu ..................... G06F 3/04847 |

FOREIGN PATENT DOCUMENTS

| | | |
|---|---|---|
| CN | 108392076 | 8/2018 |
| EP | 3505021 | 7/2019 |
| EP | 3616575 | 3/2020 |
| IN | 201931033033 | 9/2019 |
| JP | 6186488 | 8/2017 |
| WO | WO 2015/167846 | 11/2015 |
| WO | WO 2017/146991 | 8/2017 |
| WO | WO 2020/132457 | 6/2020 |
| WO | WO 2021/247421 | 12/2021 |

OTHER PUBLICATIONS

Bevi, "Bevi Offers New Touchless Beverage Dispensing Feature," Retrieved from the Internet at: https://www.vendingmarketwatch. com/beverage/news/21142193/bevi-offers-new-touchless-beverage-dispensing-feature, (Jun. 15, 2020).

Bunn, Bunn Introduces VirtualTouch, Retrieved from the Internet at: https://www.vendingmarketwatch.com/coffee-service/news/21148461/bunn-introduces-virtualtouch (Jul. 31, 2020).

Cafection, "Sophia Touchless Solutions in Action," Retrieved from the Internet at: https://www.youtube.com/watch?v=nt02UIHaxel &feature=emb_title, (Youtube Video ugloaded May 20, 2020).

Carimali, "Touchless Solutions," accessed via the Internet at: https://www.carimali.com/en/press-and-media/video/touchless-solutions/ (Jun. 24, 2020).

Coca-Cola Company, "Coca-Cola rolls out contactless Freestyle beverage dispenser," accessed via the Internet at: https://www.vendingtimes.com/news/coca-cola-co-rolls-out-contactless-freestyle-beverage-dispenser/ (Jul. 13, 2020).

De Jong Duke, "ConnectMe—Keeps you Informed," accessed via the Internet at: https://www.dejongduke.us/products/connectme-option/ (believed to be publically available by May 18, 2021).

Elkay Manufacturing Company Corp., "Smartwell® Touchless Beverage Dispenser," accessed via the Internet at: https://www.vendingmarketwatch.com/coffee-service/water-equipment-coolers-filters-accessories-etc/product/21152498/elkay-smartwell-touchless-beverager-dispenser (Aug. 31, 2020).

Jura Elektroapparate AG, "J.O.E.® brings state-of-the-art operation to your smartphone," accessed via the Internet at: https://US.jura.com/en/homeproducts/accessories/JOE?utm_source=redir&utm_medium=US&utm_content=US-en&utm_campaign=joe#&gid=undefined&pid=2 (believed to be publically available by May 18, 2021).

Lavazza, "Flavia Creation 600," accessed via the Internet at: https://www.vendingtimes.com/news/lavazza-to-launch-hygienic-brewer/ (Jul. 17, 2020).

Nespresso Professional, "New Features for Safer Coffee Moments," accessed via the Internet at: https://www.nespresso.com/pro/de/en/momento-touchless (believed to be publically available by May 18, 2021).

(56) References Cited

OTHER PUBLICATIONS

Newco Enterprises, "Newco Touchless Solutions," accessed via the Internet at: https://www.newcocoffee.com/newco-touchless-solutions/ (Jul. 13, 2020).

Schaerer AG, "Touchless Coffee Schaerer Soul QR Demo," accessed via the Internet at: https://www.youtube.com/watch?v= 4w1mhGYjVPY (Nov. 3, 2020).

Search Report & Written Opinion issued in Int'l Appl. No. PCT/ US2021/032988 (2021).

Sestra Systems, "Touchless Smart Dispensing," accessed via the Internet at: https://www.sestrasystems.com/touchless/ (believed to be publically available by May 18, 2021).

Thermoplan AG, "Touchless Coffee Enjoyment," Brochure (Jul. 15, 2021).

Bunn-O-Matic Corporation, "ADA Standards for Accessible Design," Brochure (Mar. 15, 2012).

\* cited by examiner

800 →

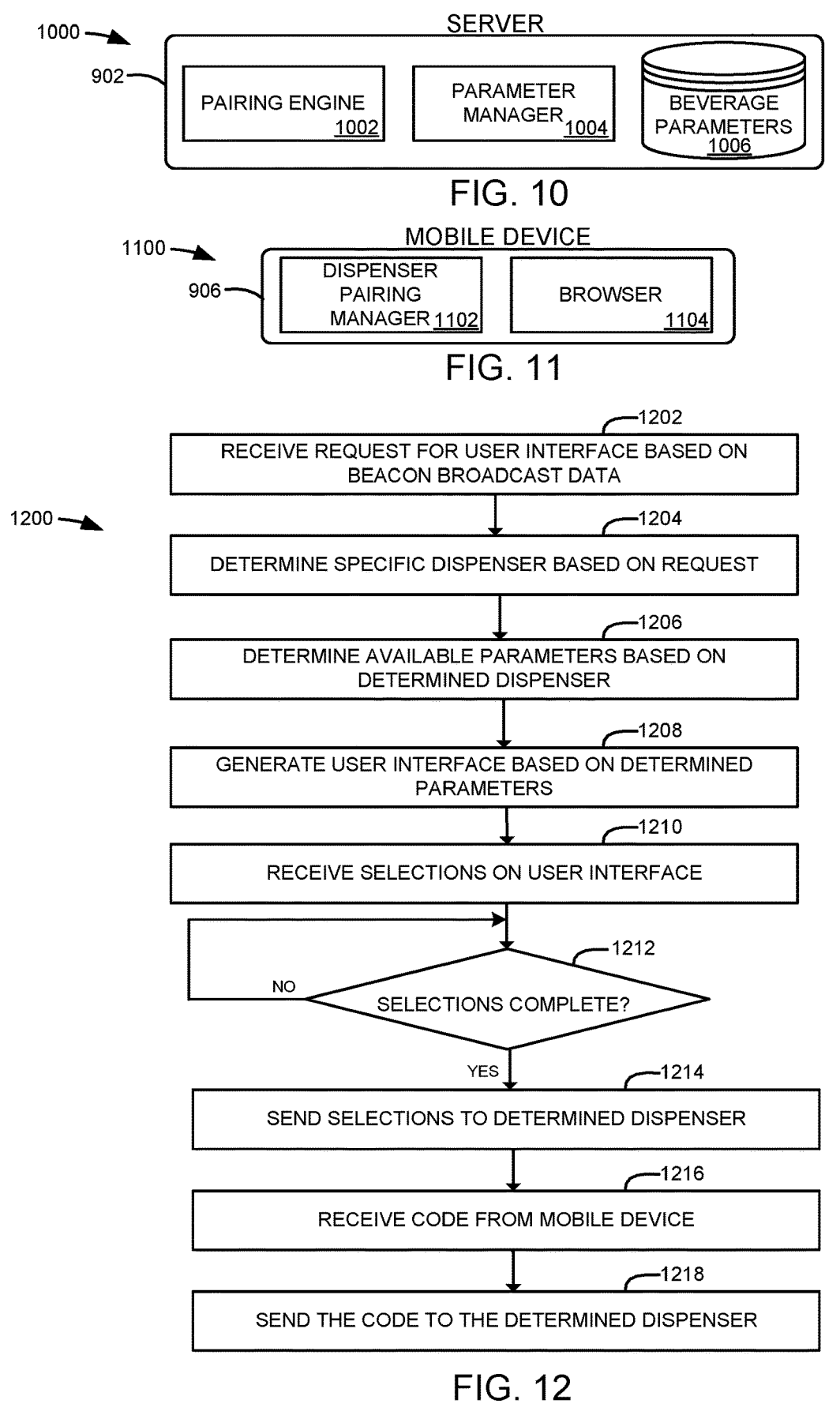

1000 →

SERVER

902 →

| PAIRING ENGINE 1002 | PARAMETER MANAGER 1004 | BEVERAGE PARAMETERS 1006 |

MOBILE DEVICE

906 →

| DISPENSER PAIRING MANAGER 1102 | BROWSER 1104 |

┌─ 1202
RECEIVE REQUEST FOR USER INTERFACE BASED ON BEACON BROADCAST DATA

┌─ 1204
DETERMINE SPECIFIC DISPENSER BASED ON REQUEST

┌─ 1206
DETERMINE AVAILABLE PARAMETERS BASED ON DETERMINED DISPENSER

┌─ 1208
GENERATE USER INTERFACE BASED ON DETERMINED PARAMETERS

┌─ 1210
RECEIVE SELECTIONS ON USER INTERFACE

┌─ 1212
SELECTIONS COMPLETE?
NO
YES

┌─ 1214
SEND SELECTIONS TO DETERMINED DISPENSER

┌─ 1216
RECEIVE CODE FROM MOBILE DEVICE

┌─ 1218
SEND THE CODE TO THE DETERMINED DISPENSER

FIG. 12

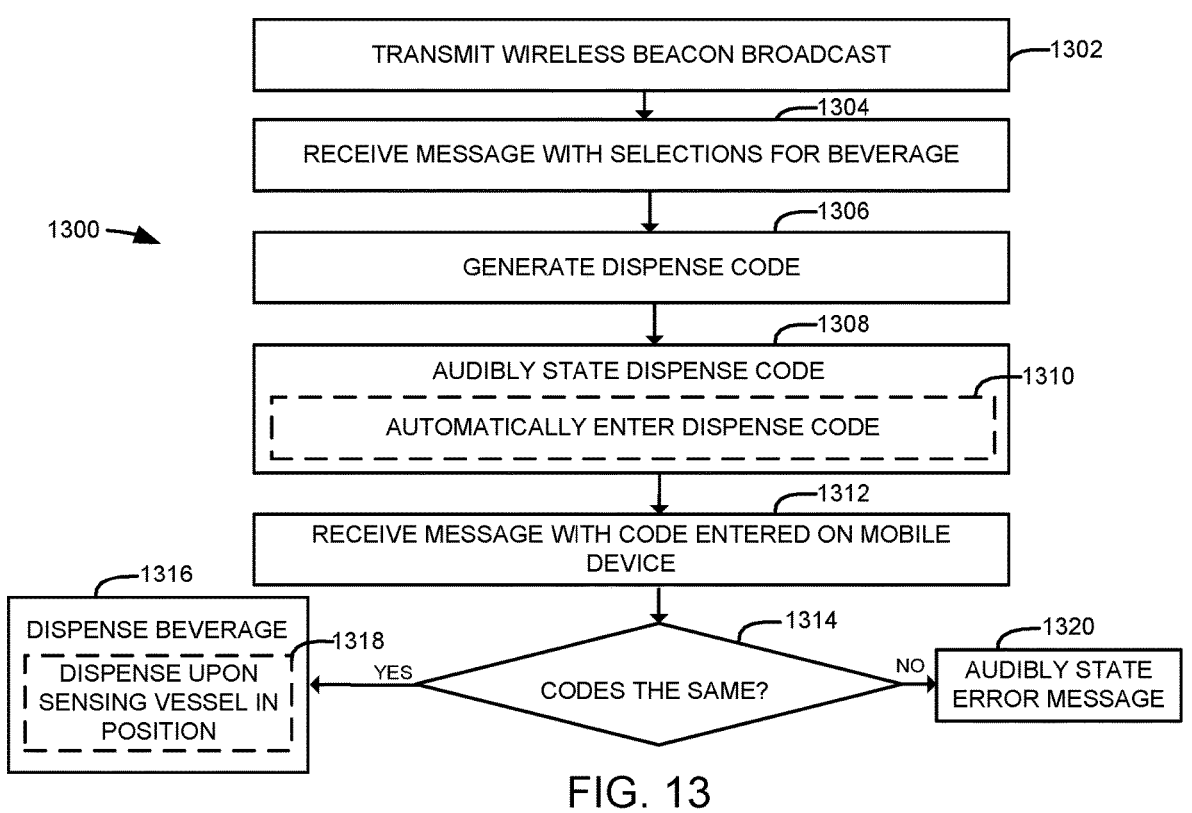

1300 →

TRANSMIT WIRELESS BEACON BROADCAST ──1302

RECEIVE MESSAGE WITH SELECTIONS FOR BEVERAGE ──1304

GENERATE DISPENSE CODE ──1306

AUDIBLY STATE DISPENSE CODE ──1308
┌─────────────────────────────────────────┐──1310
│ AUTOMATICALLY ENTER DISPENSE CODE │
└─────────────────────────────────────────┘

RECEIVE MESSAGE WITH CODE ENTERED ON MOBILE DEVICE ──1312

──1316
┌─────────────────────────┐
│ DISPENSE BEVERAGE │──1318
│ ┌─────────────────────┐ │  YES
│ │ DISPENSE UPON │ │←────  CODES THE SAME? ──1314
│ │ SENSING VESSEL IN │ │
│ │ POSITION │ │
│ └─────────────────────┘ │
└─────────────────────────┘

NO  ──1320
AUDIBLY STATE ERROR MESSAGE

FIG. 13

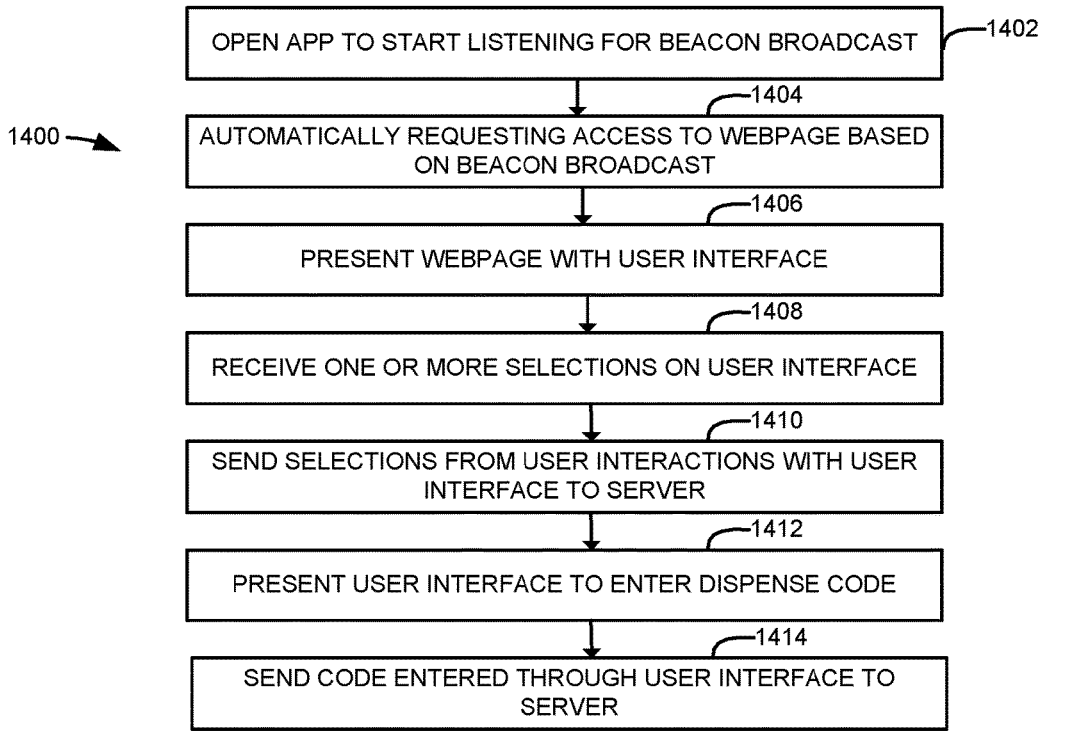

1400 →

OPEN APP TO START LISTENING FOR BEACON BROADCAST ──1402

AUTOMATICALLY REQUESTING ACCESS TO WEBPAGE BASED ON BEACON BROADCAST ──1404

PRESENT WEBPAGE WITH USER INTERFACE ──1406

RECEIVE ONE OR MORE SELECTIONS ON USER INTERFACE ──1408

SEND SELECTIONS FROM USER INTERACTIONS WITH USER INTERFACE TO SERVER ──1410

PRESENT USER INTERFACE TO ENTER DISPENSE CODE ──1412

SEND CODE ENTERED THROUGH USER INTERFACE TO SERVER ──1414

FIG. 14

DISPENSING CONTROL SYSTEM FOR ACCOMMODATING PERSONS WITH DISABILITIES AND METHOD

RELATED APPLICATIONS

This application claims the benefit of U.S. Provisional Application Ser. No. 63/041,290 filed Jun. 19, 2020 for a "Dispensing System with Gesture Control and Method," which is hereby incorporated by reference in its entirety.

TECHNICAL FIELD

This disclosure relates generally to touchless product dispensers; in particular, this disclosure relates to a touchless dispenser for accommodating persons with disabilities.

BACKGROUND

The present disclosure relates to dispensing devices, such as devices for dispensing vending products, coffee, tea, juice, soft drinks, and the like. With existing devices for dispensing beverages, for example, the user typically makes selections and initiates dispensing of the beverage by touching exterior surfaces of the device, such as a touchscreen, buttons, dials, etc. For example, the user may select a recipe for a coffee or tea beverage, and initiate brewing by touching various portions of the brewer's touchscreen or other controls.

It would be preferable to not have multiple users touching the external surfaces of the device. For example, a user that may not have washed their hands could potentially contaminate surfaces of the device when that the user touches the controls to make selections and start dispensing the product. These contaminated areas could potentially result in the user sharing germs with a subsequent user that touches the same surfaces to control the device.

There are existing devices for dispensing products that can be operated in a touchless manner. For example, some existing devices include proximity sensor(s) that can be used to turn on/off a dispenser in a touchless manner. However, unless a dispenser is manufactured with such touchless capabilities, typically adding touchless capability requires replacement of the dispenser with one that includes touchless capability.

Therefore, there is a need for a device for retrofitting dispensing products to add touchless control without the expense of replacing the dispenser with a new touch capable device.

SMMARY

According to one aspect, this disclosure provides a dispenser with a dispensing subsystem, a user interface, a processor and memory. The dispensing subsystem is configured to selectively dispense a product. The user interface is configured to present one or more product options for selection. The processor is configured to control the user interface and the dispensing subsystem. The non-transitory, computer-readable storage media includes a plurality of instructions stored thereon that, in response to being executed, cause the processor to: establish a first mode of controlling selection and dispensing of products, wherein in the first mode, the user interface is configured to receive one or more product selection options and initiate dispensing of one or more products through physical interaction with one or more external surfaces of the dispenser; in response to detecting a touchless activation input, establish a second mode of controlling selection and dispensing of products, wherein in the second mode, the user interface is configured to detect one or more product selection options and initiate dispensing of one or more products through touchless interaction with a touchless sensor of the dispenser; and switch from the second mode to the first mode in response to one or more of: (1) dispensing a product in the second mode; or (2) a predetermined time period elapsing.

According to another aspect, this disclosure provides an accessibility panel for retrofitting with a dispenser with gesture control. The accessibility panel includes a plurality of physical buttons, wherein at least a portion of the plurality of physical buttons are associated with respective input commands. There is a gesture recognition sensor configured to detect a plurality gestures within range of the gesture recognition sensor. The accessibility panel also includes an input command subsystem configured to translate the plurality of gestures into respective input commands corresponding with at least a portion of the plurality of physical buttons.

According to a further aspect, this disclosure provides a method of dispensing a product. The method includes the step of establishing a first mode of controlling selection and dispensing of products on a dispenser, wherein in the first mode, a user interface on the dispenser is configured to receive one or more product selection options and initiate dispensing of one or more products through physical interaction with one or more external surfaces of the dispenser. There is also the step of establishing a second mode of controlling selection and dispensing of products in response to detecting a touchless activation input with a gesture recognition sensor of the dispenser, wherein in the second mode, the user interface is configured to detect one or more product selection options and initiate dispensing of one or more products through gesture interaction with the gesture recognition sensor of the dispenser. The method also includes switching from the second mode to the first mode in response to one or more of: (1) dispensing a product in the second mode; or (2) a predetermined time period elapsing.

According to yet another aspect, this disclosure provides a network-controlled dispensing device for a visually-impaired user. The network-controlled dispensing device includes a wireless beacon and a controller. The wireless beacon wirelessly broadcasts an identifier that uniquely identifies the dispensing device to a mobile computing device within a reference range of the wireless beacon. The controller is to control dispensing of a product based on one or more product selections received from a server. The controller generates a dispense code in response to receiving one or more product selections from the server and audibly presents the dispense code via a speaker. The controller is to dispense a product based on the one or more product selections received from the server in response to receiving a code from the server that matches the dispense code.

BRIEF DESCRIPTION OF THE DRAWINGS

FIG. 10 is a simplified block diagram of various environments of the server of FIG. 9;

FIG. 11 is a simplified block diagram of various environments of the mobile device of FIG. 9;

FIG. 12 is a simplified flow diagram of at least one embodiment of a method for facilitating beverage parameter selection and dispensing control of the server of FIG. 9;

FIG. 13 is a simplified flow diagram of at least one embodiment of a method for facilitating touchless selection and dispensing of a beverage via the dispenser;

FIG. 14 is a simplified flow diagram of at least one embodiment of a method for selecting and initiating dispensing of a beverage via the mobile device of FIG. 9.

DETAILED DESCRIPTION OF THE DRAWINGS

Figure 1:
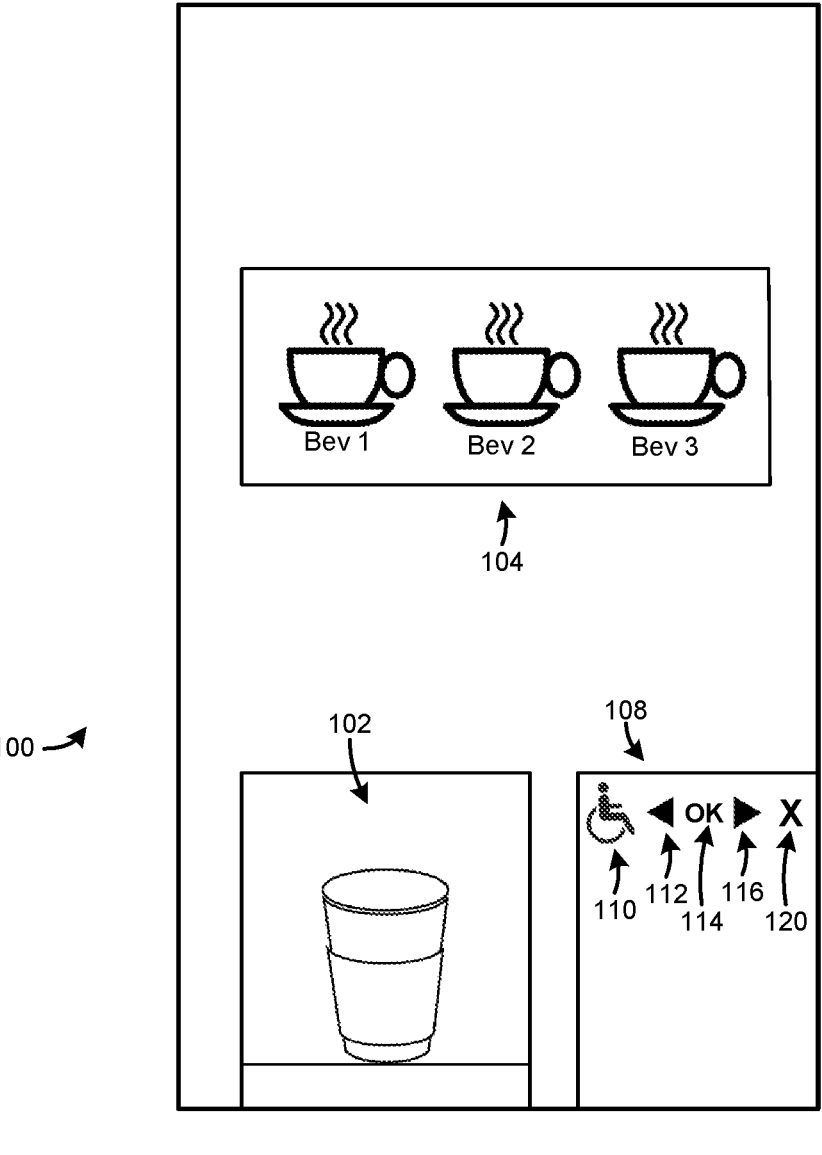
FIGS. 1 and 2 are simplified illustrations of prior art dispensers without gesture control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
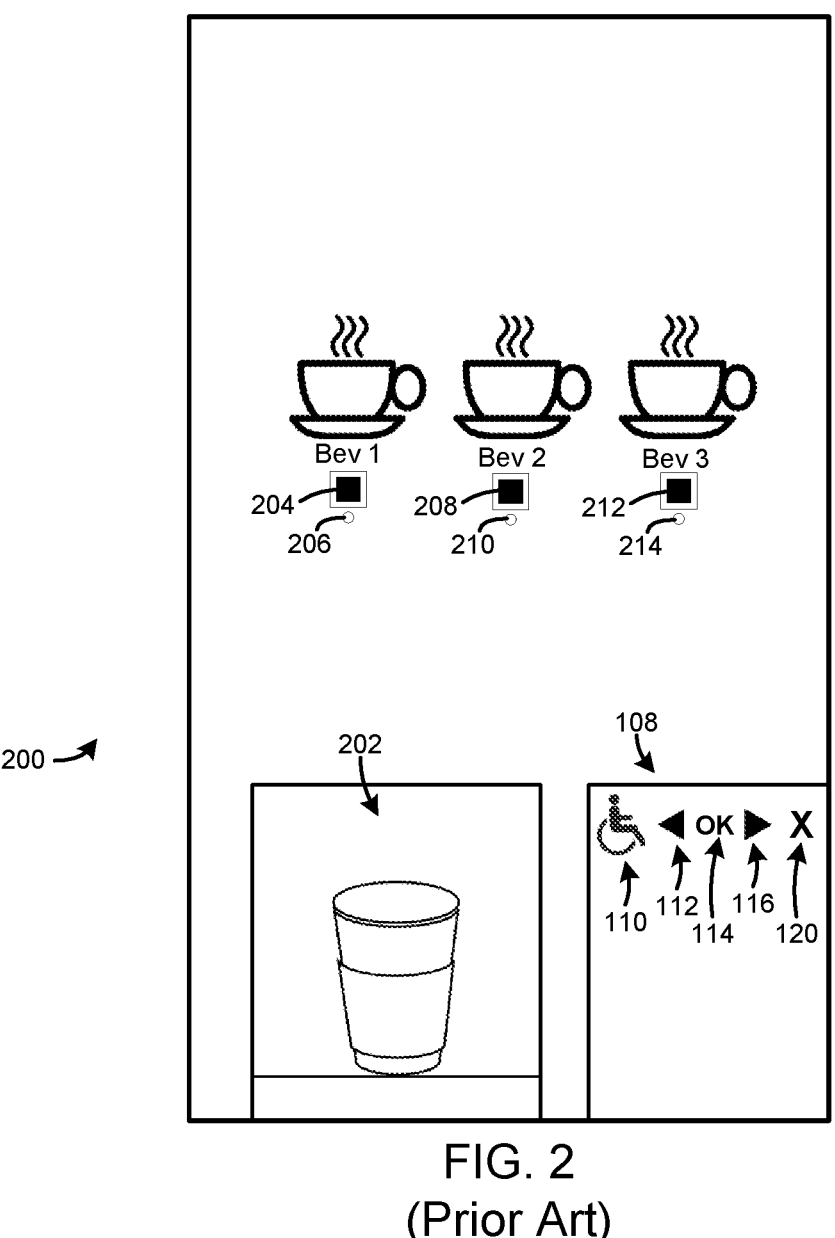

FIGS. 1 and 2 illustrate example prior art dispensers for dispensing a product, such as coffee or tea, without gesture control. In the example shown in FIG. 1, there is a dispenser 100 that is configured to dispense a product into a dispensing area 102 based on selection of one or more parameters selected by the user. In this example, the dispenser 100 includes a touchscreen 104 from which the user can select one or more parameters regarding the product to be dispensed. This dispenser 100 includes an accessibility panel 108, which is positioned lower on the dispenser 100, for users that may not be able to able to reach the touchscreen 104 to make selections, such as a person in a wheelchair. The accessibility panel 108 allows a user to enter into an accessibility mode from which the user can make selections from the buttons on the accessibility panel 108 instead of the touchscreen 104.

In this example, the accessibility panel 108 includes an activation button 110, a previous button 112, an enter button 114, a next button 116, and a cancel button 120. When a user selects the activation button 110 from the accessibility panel 108, the dispenser 100 enters into an accessibility mode in which items displayed on the touchscreen 104 can be selected through buttons 112, 114, 116 on the accessibility panel 108 instead of actually touching the touchscreen. For example, the dispenser 100 may be programmed to highlight a selected product on the touchscreen 104 based on user selection of the previous button 112 and next button 116. For example, the dispenser 100 may be configured to highlight "Bev 1" initially, and switch to highlighting "Bev 2" in response to selection of the next button 116. Upon the user again selecting the next button 116, the dispenser 100 may be programmed in the accessibility mode to then highlight "Bev 3." If the user then selects the previous button 112, the dispenser 100 may be programmed to then highlight "Bev 2," and then "Bev 1" upon another selection of the previous button 112. In this manner, the user may navigate the user interface with the previous button 112 and next button 116. After the user has navigated the user interface, the enter button 114 can be selected to make one or more selections, which causes the dispenser 100 to dispense the selected product. If the user decides to exit accessibility mode, the user may select the cancel button 120, which causes the dispenser 100 to exit out of the accessibility mode. After the dispenser 100 exits the accessibility mode, the dispenser 100 again receives selections through the touchscreen 104.

The prior art dispenser 200 shown in FIG. 2 is similar to FIG. 1, with a dispensing area 202, and an accessibility panel 108. However, instead of a touchscreen 104, the dispenser 200 includes a first button 204 and first LED 206 corresponding to "Bev 1," a second button 208 and second LED 210 corresponding to "Bev 2," and a third button 212 and third LED 214 corresponding to "Bev 3." In default mode, the user would select the first button 204 to select "Bev 1," which illuminates the first LED 206. Likewise, the user would select the second button 208 to select "Bev 2," and the third button 212 to select "Bev 3." As with the first button 204, the second LED 210 illuminates when second button 208 is selected and the third LED 214 illuminates when the third button 212 is selected. However, when the dispenser 200 enters into the accessibility mode, similar to dispenser 100, the user will use the previous button 112 and next button 116 to select a beverage, and then select the enter button 114 to dispense the selected product. As the user navigates the selection of the product by selecting the previous button 112 and the next button 116, the LEDs 206, 210, and 214 will illuminate to show the currently selected product.

Figure 3:
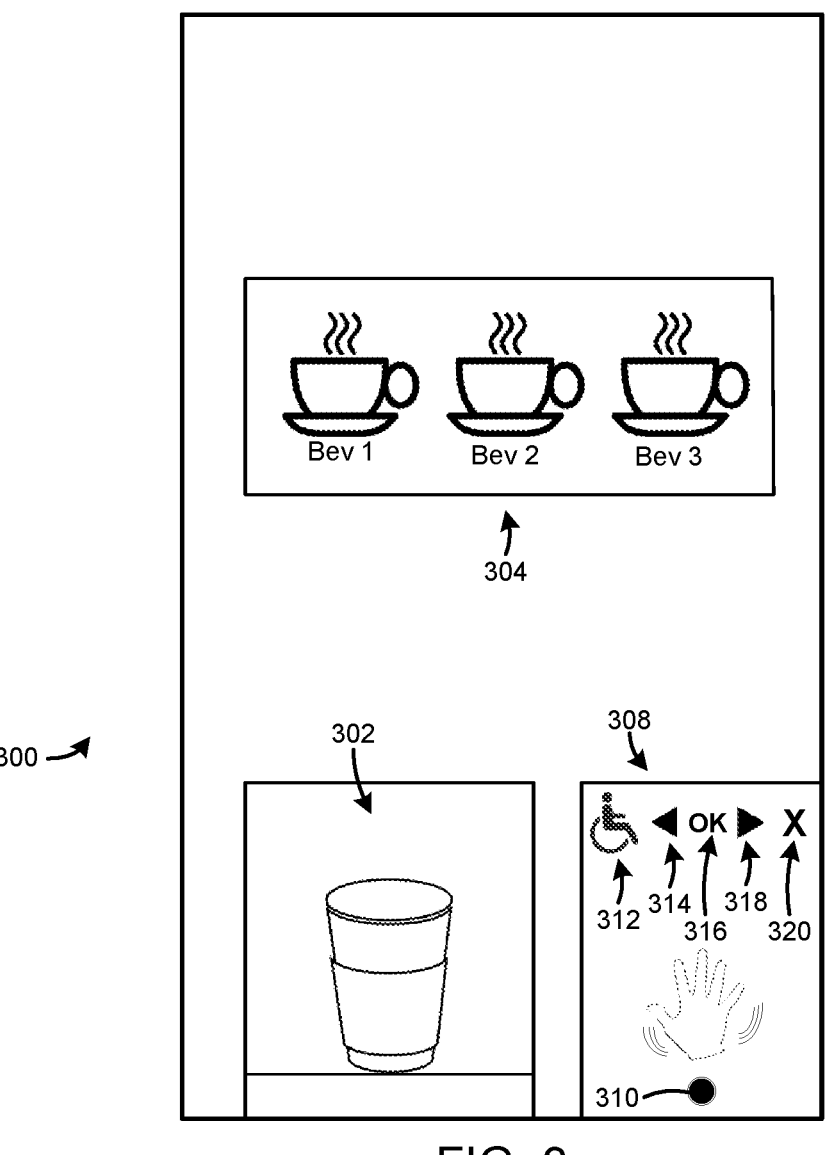
FIG. 3 is a simplified illustration of at least one embodiment of a dispenser with a gesture control mode having a display.
Figure 4A:
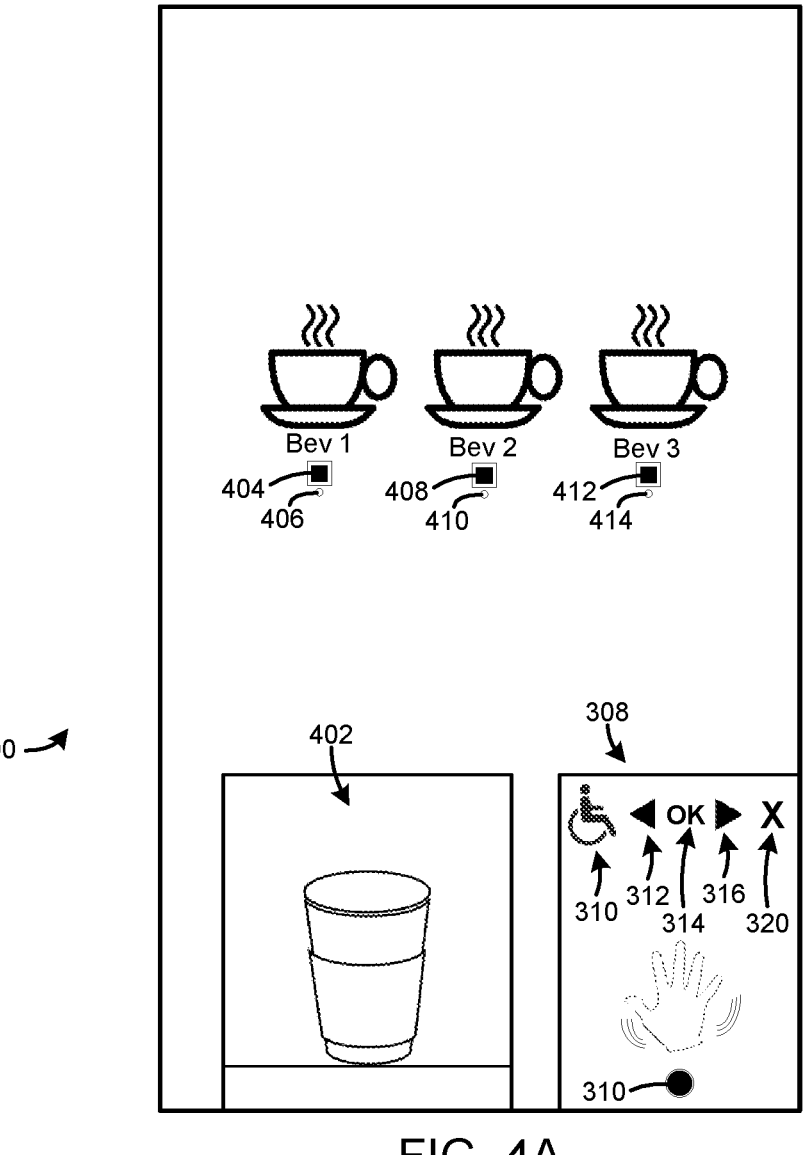
FIGS. 4A and 4B are simplified illustrations of various embodiments of a dispenser with a gesture control mode without a display.
Figure 4B:
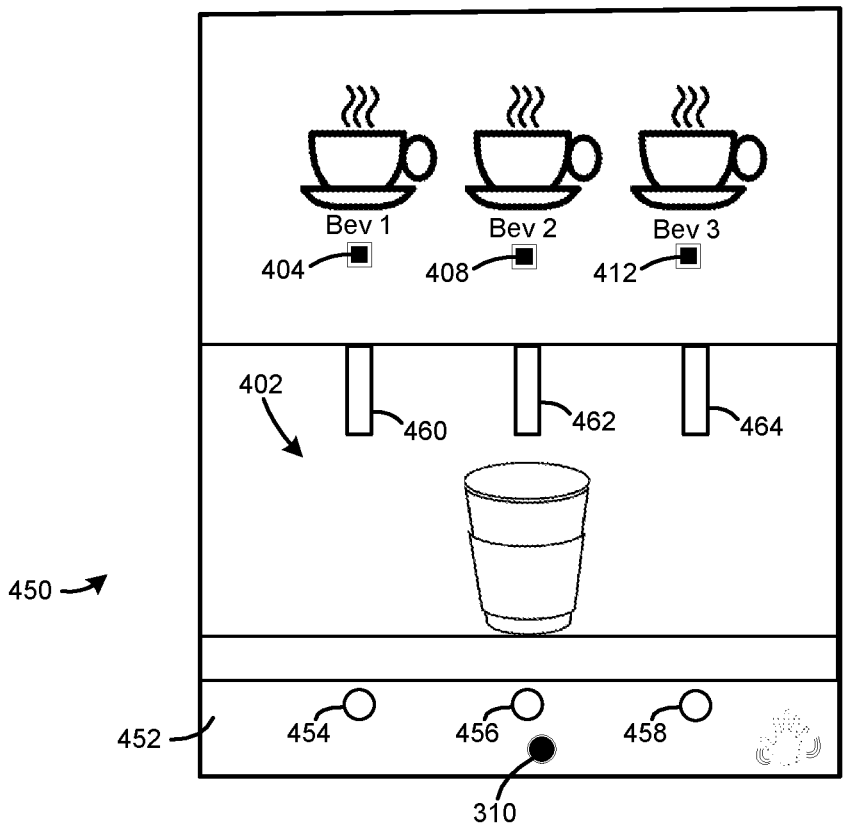

FIGS. 3, 4A, and 4B illustrate dispensers with a gesture control mode according to one or more embodiments of this disclosure. Although the dispensers shown in FIGS. 3, 4A, and 4B show graphics with coffee or tea as the beverage being dispensed for purposes of example, this disclosure encompasses any type of product that could be dispensed, including but not limited to vending products, brewed beverages (e.g., tea, coffee, etc.), water, liquor, beer, milk, juice, soft drinks, soup, salad dressing and/or or other products.

FIG. 3 illustrates a dispenser 300 that is configured to dispense a product into a dispensing area 302 based on selection of one or more parameters selected by the user. In this example, the dispenser 300 includes a touchscreen 304 from which the user can select one or more parameters regarding the product to be dispensed by interacting with the touchscreen 304. The dispenser 300 includes an accessibility panel 308, which is positioned lower on the dispenser 300, for users that may not be able to able to reach the touchscreen 304 to make selections, such as a person in a wheelchair. The accessibility panel 308 allows a user to enter into an accessibility mode from which the user can make selections from the accessibility panel 308 instead of the touchscreen 304. In the embodiment shown, the accessibility panel 308 includes a gesture control mode. As shown, the accessibility panel 308 includes both buttons and a gesture recognition sensor 310 from which the user can navigate product options and make a selection. As shown, the accessibility panel 308 includes an activation button 312, a previous button 314, an enter button 316, a next button 318, and a cancel button 320. The buttons on the accessibility panel work similarly to that described above with respect to FIGS. 1 and 2. Although the previous button 314 and next button 318 are example navigation buttons, other navigation buttons, such as an up button and/or down button, could be provided depending on the circumstances.

In addition to the buttons, the accessibility panel 308 includes a gesture recognition sensor 310 that allows a user to navigate and make product selections by making gestures within range of the gesture recognition sensor 310. Of course, in addition to those users who cannot reach the touchscreen 304, any users that want to make product selections without touching the touchscreen 304, could use the gesture recognition sensor 310.

In some embodiments, the gestures could be mapped to the buttons on the accessibility panel 308 to allow the accessibility panel 308 to be retrofitted with existing dispensers, such as dispenser 100 with accessibility panel 108 and/or dispenser 200 to add gesture control. For example, the dispenser 300 could be the dispenser 100 after being upgraded with accessibility panel 308 to add gesture control. By way of example, Gesture 1 (e.g., holding hand in front of gesture recognition sensor 310 longer than a predetermined time) may correspond to the activation button 312, Gesture 2 (e.g., right-to-left hand or arm movement) may correspond to the left button 314, Gesture 3 (e.g., upward hand or arm movement) may correspond with enter button 316, Gesture 4 (e.g., left-to-right hand or arm movement) may correspond with the right button 318, and Gesture 5 (e.g., downward hand or arm movement) may correspond to the cancel button 320. Of course, other gestures instead of these examples could be mapped with functionality of the buttons on the accessibility panel 308. With the gestures mapped to corresponding buttons, the accessibility panel 308 could be swapped with accessibility panel 108 without any need to perform a software update or otherwise update the dispenser 100 and/or dispenser 200 because the output of the accessibility panel 308 would be the same as if the user selected physical buttons (which are mapped to corresponding gestures). Thus, in embodiments in which the gestures are mapped to corresponding buttons, the accessibility panel 308 could be used to retrofit an existing dispenser, such as dispensers 100 and 200, to add gesture control.

In this example, the gesture recognition sensor 310 is configured to recognize a plurality of gestures that are mapped to the buttons 312, 314, 316, 318, and/or 320 so the user can make selections in a touchless manner. For example, the dispenser 300 may be programmed to highlight a selected product on the touchscreen 304 based on user navigation of the user interface on the touchscreen using a plurality of gestures. Consider an example in which the dispenser 300 is configured to initially highlight "Bev 1," and switches to highlighting "Bev 2" in response to the user making a left-to-right gesture. Upon the user making another left-to-right gesture, the dispenser 300 may then highlight "Bev 3." Continuing this example, the user then makes a right-to-left gesture, the dispenser 300 may be programmed to then highlight "Bev 2," and then "Bev 1" upon another right-to-left gesture. In this manner, the user may navigate the user interface with a plurality of gestures within range of the gesture recognition sensor 310. After the user has navigated the user interface, another gesture, such as an upward gesture, could be used to make a selection, which could cause the dispenser 300 to dispense the selected product (unless additional selections are needed or desired prior to dispensing the product). If the user decides to exit accessibility mode (i.e., gesture control mode), the user may make another gesture, such as a downward gesture, which causes the dispenser 300 to exit out of accessibility mode. After the dispenser 300 exits accessibility mode (i.e., gesture control mode), the dispenser 300 again receives selections through physical touches with the touchscreen 304. Alternatively, the accessibility panel 308 could time out of gesture control mode.

Referring now to FIG. 4A, the dispenser 400 is similar to the dispenser 300 shown in FIG. 3, with a dispensing area 402, and an accessibility panel 308 with a gesture control feature. However, instead of a touchscreen 304, the dispenser 400 includes a first button 404 and first LED 406 corresponding to "Bev 1," a second button 408 and second LED 410 corresponding to "Bev 2," and a third button 412 and third LED 414 corresponding to "Bev 3." In default mode, the user would select the first button 404 to select "Bev 1," which illuminates the first LED 406. Likewise, the user would select the second button 408 to select "Bev 2," and the third button 412 to select "Bev 3." As with the first button 404, the second LED 410 illuminates when second button 408 is selected and the third LED 414 illuminates when the third button 412 is selected. However, when the dispenser 400 enters into the accessibility mode (i.e., gesture control mode), similar to dispenser 300, the user will use a plurality of predetermined gestures within range of the gesture recognition sensor 310 to select and dispense a product. As the user navigates the selection of the product by using various gestures in front of the gesture recognition sensor 310, the LEDs 406, 410, and 414 may illuminate to show the currently selected product. The LEDs 406 on dispenser 400 and touchscreen 304 on dispenser 300 are shown as example user interfaces from which the user can see selections from the accessibility panel, but other user interfaces, whether visual or audible, could be used to identify selections to the user based on gesture control of the accessibility panel 308.

FIG. 4B illustrates a dispenser 450 that is similar to the dispenser 400 shown in FIG. 4A, with a dispensing area 402, and an accessibility panel 452 with a gesture control feature. However, instead of the LEDs 406, 410, 416 near the buttons 404, 408, 412 on the dispenser 400, the dispenser 450 does not have any LEDs on the dispenser 450 itself, but instead the accessibility panel 452 includes a first LED 454 corresponding to "Bev 1," a second LED 456 corresponding to "Bev 2," and a third LED 458 corresponding to "Bev 3." The dispenser 450 includes three beverages for purposes of example, but the dispenser 450 could have more or less beverages (or other products) depending on the circumstances. As shown, the dispenser 450 includes a first spout 460 configured to dispense "Bev 1," a second spout 462 configured to dispense "Bev 2," and a third spout 464 configured to dispense "Bev 3." In the embodiment shown, the LEDs 454, 456, 458 on the accessibility panel 452 are arranged to correspond with the spacing of the spouts 460, 462, 464 to show an association with those beverages to the user. Of course, there may be other ways, such as labeling near the LEDs 454, 456, 458, to indicate which LEDs correspond with which beverages. When the user activates gesture mode using an activating gesture, which could be done with a variety of gestures, the LEDs 454, 456, 458 may each illuminate to indicate that the accessibility panel 452 has entered gesture mode. If the user would like to select "Bev 2," for example, the user could navigate to select "Bev 2" by using various gestures in front of the gesture recognition sensor 310, and the LEDs 454, 456, and 458 may illuminate to show the currently selected product. By way of example only, the user may perform a first left-to-right gesture to initially select "Bev 1," which illuminates LED 454, and then perform another left-to-right gesture to select "Bev 2," which illuminates LED 456. The user could then perform a dispense gesture to dispense "Bev 2." For example, if holding the user's hand in front of the gesture recognition sensor 310 is the dispense gesture, the user could hold his/her hand in front of the gesture recognition sensor 310 to dispense "Bev 2." In this example, the user could stop dispensing "Bev 2" by removing his/her hand from in front of the gesture recognition sensor 310; the user could resume dispensing "Bev 2" by again placing his/her hand in front of the gesture recognition sensor 310.

Figures 5, 6:
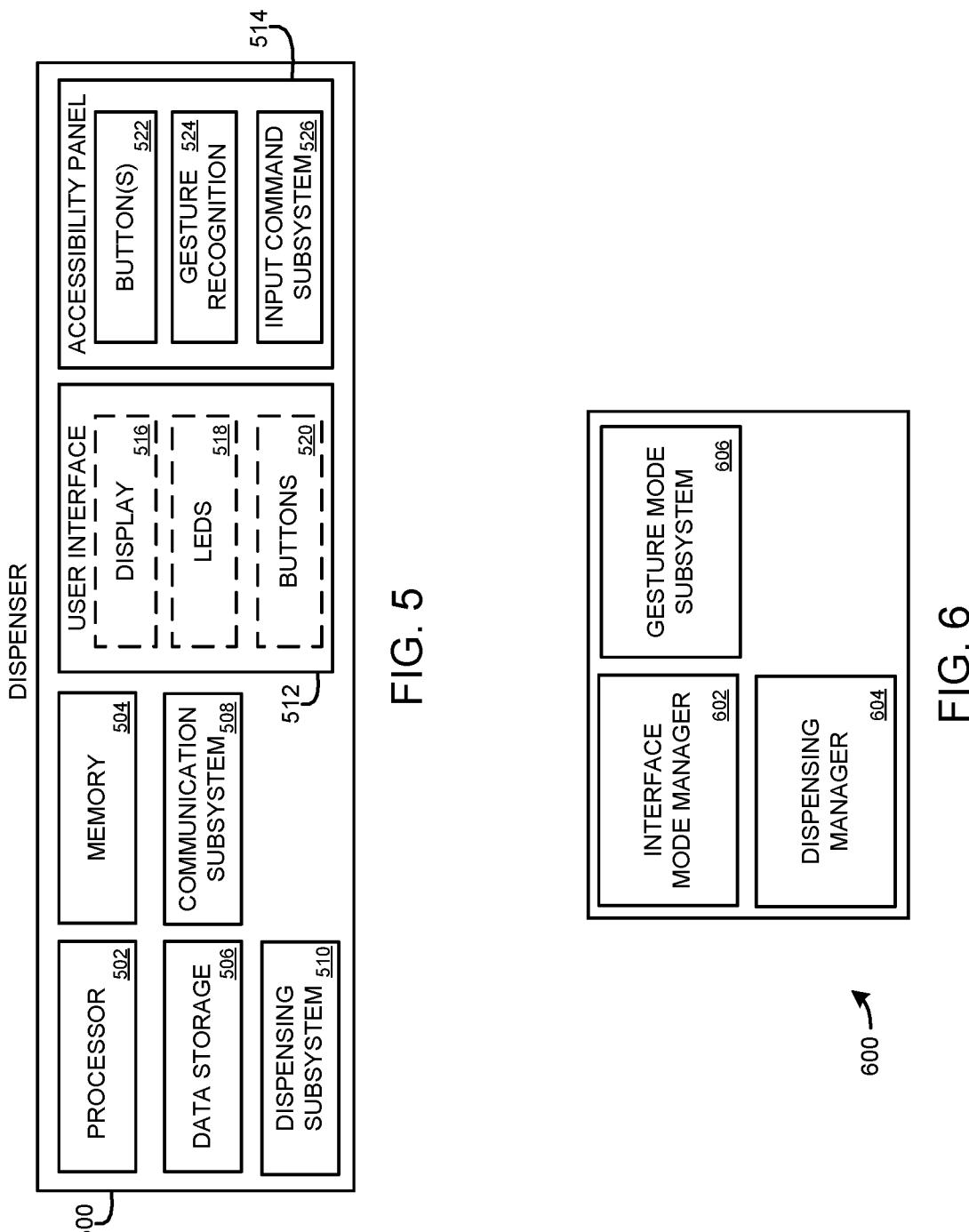
FIG. 5 is a simplified block diagram of at least one embodiment of a dispenser with a gesture control mode.
FIG. 6 is a simplified block diagram of various environments of the dispenser of FIG. 5.

Referring now to FIG. 5, there is shown a dispenser 500 that is configured to enter into a gesture control mode to select and dispense a product in a touchless manner, which could be embodied as the dispenser 300 and/or dispenser 400 or dispenser 100 and/or dispenser 200 after being upgraded with accessibility panel 308. When in the gesture control mode, the dispenser 500 allows the user to control dispensing of a product without touching any external surface of the dispenser 500, which could potentially be contaminated. Although there is the option for allowing the user to interact with a touchscreen, buttons or other external surfaces of the dispenser 500 for selection and/or dispensing of a beverage, the dispenser 100 includes the gesture control mode that allows a user to select a product (and/or customize parameters of the product), and initiate dispensing using gestures without touching the dispenser 500. In some embodiments, there is an additional technical advantage that the gesture control feature could be incorporated into the accessibility panel so it could be swapped with an existing accessibility panel without gesture control to retrofit existing dispensers with a gesture control feature without needing to re-program the dispenser because the gestures would be mapped to the buttons on the existing accessibility panel. Thus, in the event it is desired for a dispenser to be converted to a touchless dispenser, the existing accessibility panel could be retrofit with an accessibility panel having a gesture control. The term "dispenser" is broadly intended to mean any device that could be used to dispense any type of product, including but not limited to vending products, brewed beverages (e.g., tea, coffee, etc.), water, liquor, beer, milk, juice, soft drinks, soup, salad dressing and/or or other products.

As shown in FIG. 5, the dispenser 500 includes a processor 502, a memory 504, a data storage device 506, a communication subsystem 508, a dispensing subsystem 510, a user interface 512, and an accessibility panel 514. Of course, the dispenser 500 may include other or additional components, such as those commonly found on product dispensers, in other embodiments. Additionally, in some embodiments, one or more of the illustrative components may be incorporated in, or otherwise form a portion of, another component. For example, the memory 504, or portions thereof, may be incorporated in the processor 502 in some embodiments.

The processor 502 may be embodied as any type of processor capable of performing the functions described herein, such as a single or multi-core processor, microcontroller, or other processor or processing/controlling circuit. The memory 504 may be embodied as any type of volatile or non-volatile memory or data storage capable of performing the functions described herein. In operation, the memory 504 may store various data and software used during operation of the dispenser 500 such as applications, programs, libraries, and/or drivers. The memory 504 is communicatively coupled to the processor 502. Similarly, the data storage device 506 may be embodied as any type of device or devices configured for short-term or long-term storage of data such as, for example, memory devices and circuits, memory cards, hard disk drives, solid-state drives, nonvolatile flash memory, or other data storage devices. The communication subsystem 508, which may be embodied as any communication circuit, device, or collection thereof, capable of enabling communications between the dispenser 500 and other remote devices over a network, such as to perform software updated and/or update product configuration and/or recipes of the dispenser 500. The communication subsystem 508 may be configured to use any one or more communication technology (e.g., wired or wireless communications) and associated protocols (e.g., Ethernet, Wi-Fi®, WiMAX, 3G, 4G LTE, etc.) to effect such communication. The dispensing subsystem 510 is configured dispense the product from the dispenser 500 based on the selected product options.

In the example shown, the user interface 512 includes a display 516, one or more LEDs 518, and/or one or more buttons 520. The display 516 may be any type of display capable of performing the functions described herein, such as a touchscreen, LED, OLED, LCD, or other type of display. The LEDs 518 may be any type of light source capable of performing the functions described herein. The buttons 520 may be any time of button, switch, knob, lever, or other switch capable of performing the functions described herein.

As shown, the dispenser 500 includes an accessibility panel 514 with a gesture control feature. As discussed herein, the accessibility panel 514 is configured to be retrofit for an existing accessibility panel without gesture control capability. For example, the accessibility panel 514 could be dimensionally similar to an existing accessibility panel so the accessibility panel 514 could be swapped with the existing accessibility panel. In the embodiment shown, the accessibility panel 514 includes one or more buttons 522, a gesture recognition sensor 524, and an input command subsystem 526. The buttons 522, for example, could include an activation button, a next button, an enter button, a previous button and/or a cancellation button, such as shown on dispensers in FIGS. 3 and 4. The gesture recognition sensor 524 is configured to recognize a plurality of gestures within range of the gesture recognition sensor 524. For example, the gesture recognition sensor 524 may recognize a variety of gestures, such as a left-to-right arm wave, a right-to-left arm wave, a downward wave, an upward wave, a diagonal wave, etc. Depending on the circumstances, the gesture recognition sensor 524 could recognize hand signals in addition to and/or alternatively from waving. By way of example only, a user may hold up three fingers within range of the gesture recognition sensor 524 to select product option three. The input command subsystem 526 is config- ured to map gestures recognized by the gesture recognition sensor 524 to corresponding buttons. For example, the input command subsystem 526 may include a cross-reference function for translating a gesture into a button command. In this manner, the accessibility panel 514 may send commands to the processor 502 that are the same or similar as the existing accessibility panel, so that the dispenser 500 does not need to be reprogrammed or updated with a software patch, based on the input command subsystem translating the gestures into corresponding button commands that the dispenser 500 is programmed to handle based on an existing accessibility panel without the gesture control feature unlike the accessibility panel 514. In this manner, the accessibility panel 514 could be swapped for an existing accessibility panel to retrofit a dispenser with a gesture control. Although accessibility panel 514 shows both buttons 522 and gesture recognition sensor 524, the buttons 522 may be optional depending on the circumstances. For example, embodiments are contemplated in which the input command subsystem 526 could translate gesture commands received by the gesture recognition sensor to corresponding button com- mands expected by the processor 502 for compatibility with buttons on existing accessibility panels without a gesture control feature so the accessibility panel 514 could be retrofitted with an existing dispenser to add gesture control without needing any software or other updates to the dis- penser because it is already programmed to receive button commands from the existing accessibility panel.

Referring now to FIG. 6, in an illustrative embodiment, the dispenser 500 establishes an environment 600 during operation to allow the dispenser 500 to switch from a default mode in which the user interacts with the dispenser 500 by touching one or more external surfaces of the user interface 512 (e.g., display 516, buttons 520, etc.) and a gesture control mode using the accessibility panel 514 in which the user can interact with the dispenser 500 in a touchless manner by using a plurality of gestures that can be recognized by the dispenser 500. The illustrative environment 600 includes an interface mode manager 602, a dispensing manager 604, and a gesture mode subsystem 606. As shown, the various components of the environment 600 may be embodied as hardware, firmware, software, or a combination thereof. As such, in some embodiments, one or more of the components of the environment 600 may be embodied as circuitry or collection of electrical devices (e.g., interface mode manager circuitry, dispensing manager circuitry, and gesture mode subsystem circuitry). It should be appreciated that, in such embodiments, one or more of the interface mode manager 602, dispensing manager 604, and gesture mode subsystem 606 may form a portion of the processor 502, the memory 504, and/or other components of the dispenser 500. Additionally, in some embodiments, one or more of the illustrative components may form a portion of another component and/or one or more of the illustrative components may be independent of one another.

The interface mode manager 602 is configured to manage when the dispenser 500 is in its default mode in which the user interacts with the dispenser 500 by touching external surfaces and when to enter the gesture control mode by using gesture(s) to control the dispenser 500. The dispensing manager 604 is configured to control the dispensing sub- system 510 to control dispensing product based on one or more selections. The gesture mode subsystem 606 is con- figured to recognize a plurality of gestures using the gesture recognition sensor 524 and translate those gestures into commands corresponding to at least a portion of the buttons 522 on the accessibility panel 514 (and/or buttons on an existing accessibility panel for which the accessibility panel 514 is being retrofitted in embodiments in which accessi- bility panel 514 does not include buttons).

Figure 7:
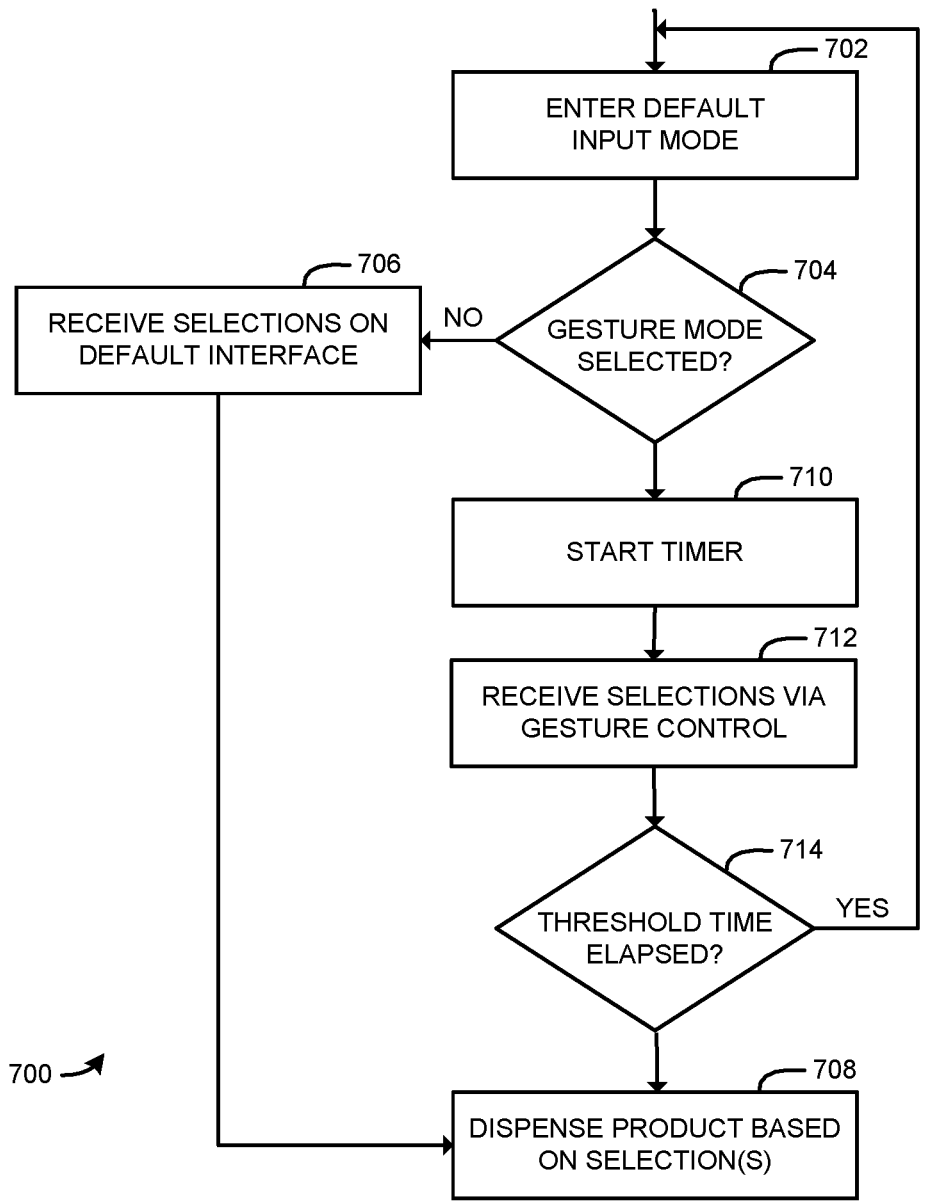
FIG. 7 is a simplified flow diagram of at least one embodiment of a method for entering into the gesture control mode.

Referring now to FIG. 7, in use, the dispenser 500, such as through the interface mode manager 602, may execute a method 700 for facilitating switching between a default mode of operation in which the user interacts with one or more external surfaces of the dispenser 500 and a gesture control mode in which the user may control the dispenser 500 using one or more gestures. In the embodiment shown, the method 700 begins in block 702, in which the dispenser initially starts in the default mode in which the user makes selections and initiates dispensing by interacting with exter- nal surface(s) of the dispenser 500. The method 700 advances to block 704 in which a determination is made whether the gesture control mode has been selected. By way of example, the user start the gesture control mode with a variety of initiating gestures, such as placing his/her hand in front of the gesture recognition sensor 524 for at least a predetermined time period, such as about 2 seconds. By way of another example, there could be a gesture motion to enter the gesture control mode, such as an upward arm motion. If the gesture mode has not been selected, the method 700 proceeds to block 706 in which the user interacts with the user interface 512 using various external surface(s) of the dispenser 500, and dispenser 500 when dispenses a product based on the interactions with the user interface 512 (block 708). If the gesture mode has been activated, the method 700 advances to block 710 in which a timer is started. The method progresses to block 712 in which one or more selections are received by recognizing gestures of the user. The method advances to block 714 in which a determination is made whether a threshold amount of time has elapsed. If so, the method 700 advances back to block 702 in which the gesture control mode is exited and the default mode is entered. In other words, the gesture control mode can timeout after a predetermined amount of time and reenter the default mode. If the threshold time has not elapsed, the dispenser 500 will dispense a product based on one or more selections received via gestures of the user.

Figure 8:
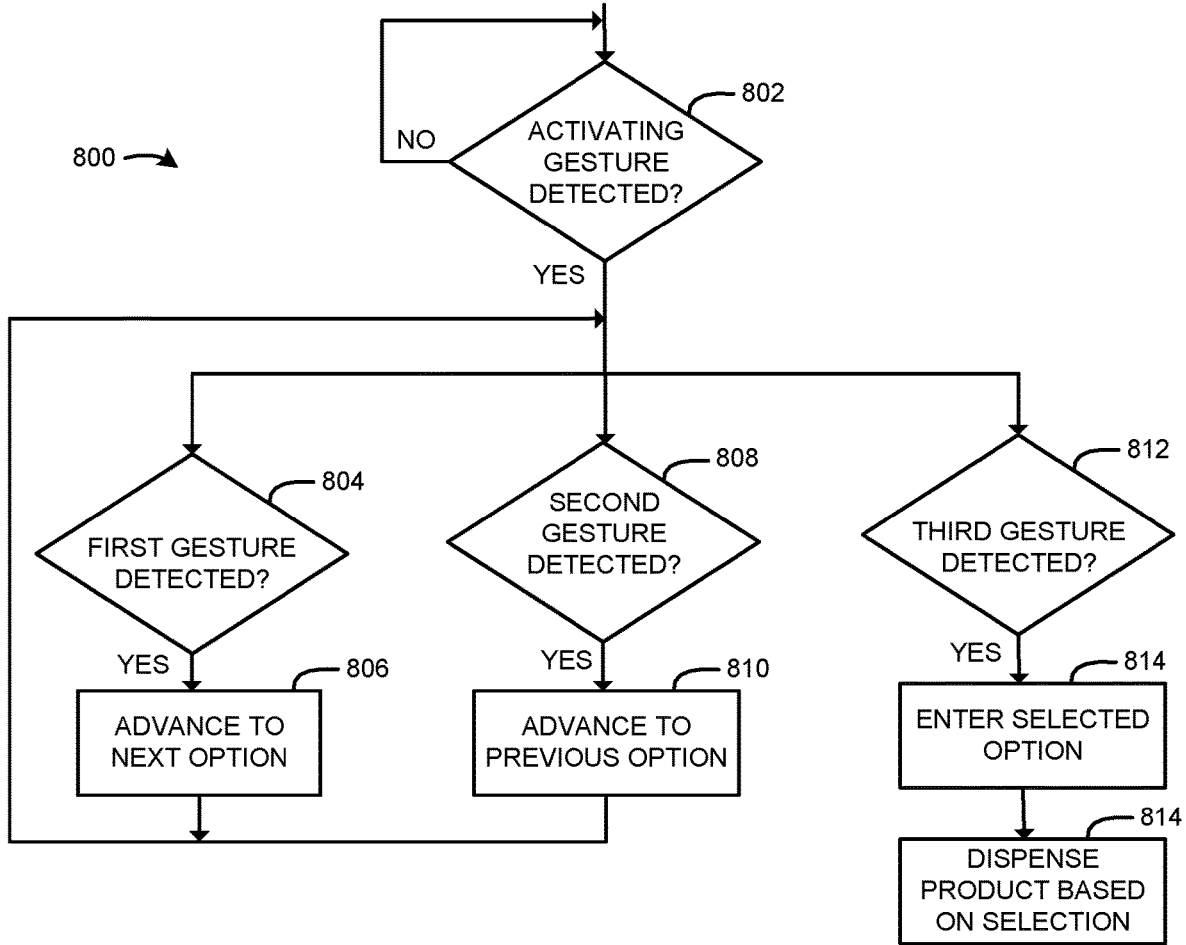
FIG. 8 is a simplified flow diagram of at least one embodiment of a method for receiving selection and dispensing control via one or more gestures.

Referring now to FIG. 8, in use, the dispenser 500, such as through the gesture mode subsystem 608, may execute a method 800 in the gesture control mode for controlling selection and dispensing of a product using gestures mapped to one or more button commands on the accessibility panel 514. In this example, the first gesture has been mapped to the next button, the second gesture has been mapped to the previous button, and the third gesture has been mapped to the enter button. Although this example shows three gestures mapped to three buttons on the accessibility panel 514 (or existing accessibility panel for which the accessibility panel is being retrofitted), more or less gestures could be mapped to more or less buttons on the accessibility panel. As discussed herein, mapping gestures to button commands on the accessibility panel 514 allows the accessibility panel 514 to be retrofitted with existing dispensers to add a gesture control feature without needing to re-configure or update the dispenser 500.

In embodiment shown, the method 800 begins in block 802 in which an activating gesture is detected, which causes the dispenser to enter into accessibility mode (i.e., gesture control mode). Upon recognizing the activating gesture, the method 800 branches to block 804, block 808, and block 812. In block 804, the method 800 makes a determination whether a first gesture has been detected. If the first gesture has been detected, the method 800 proceeds to block 806 in which the dispenser's 500 user interface 512 advances to the next option, just like the user had selected the next button on the accessibility panel 514 since the first gesture is mapped to the next button in this example. The method 800 then awaits another gesture command. If the second gesture has been recognized, the method 800 proceeds to block 810 in which the dispenser's 500 user interface 512 advances to the previous option, just like the user had selected the previous button on the accessibility panel 514 since the second gesture is mapped to the previous button in this example. If the third gesture has been recognized, the method 800 proceeds to block 814 in which the selected product options are entered, just like the user had selected the enter button on the accessibility panel 514 since the third gesture is mapped to the enter button in this example, and the product may dispensed for the selected product options (block 816).

FIGS. 9-14 illustrate another embodiment of this disclosure. In this embodiment, the accessibility panel 308, 452, 514 may be optional and no gesture controls are required to control dispensing. In the embodiment shown, there is a system 900 for facilitating touchless dispensing for a visually-impaired user. Although this embodiment will be discussed in terms of dispensing a beverage, any type of product could be dispensed. As shown, the system 900 includes a server 902, a dispenser 904, and a mobile device 906. The system 900 allows a visually-impaired user to control dispensing of a beverage (or other product) without touching any external surface of the dispenser 904, which could potentially be contaminated. Thus, instead of requiring the user to touch a touchscreen and/or buttons on the dispenser 904 for selection and/or dispensing of a beverage, the system 900 allows a user to select a beverage (and/or customize the beverage), and initiate dispensing using the mobile device 906, their own mobile device, without touching the dispenser 904. In some cases, the visually-impaired user may use built-in or third party accessibility solutions on their own mobile device to navigate the user interface, which is a familiar way for the visually-impaired user to operate their mobile device. In some embodiments, the dispenser 904 establishes a cloud-based pairing with the mobile device 906 through the server 902. For example, in some cases, the dispenser 904 broadcasts a unique network identifier specific to that specific dispenser, such as a QR code, using a wireless beacon that can be received by the mobile device 906 when the visually-impaired user comes within range of the beacon, which allows the visually-impaired user of the mobile device 906 to control dispensing of the specific dispenser 904.

Figure 9:
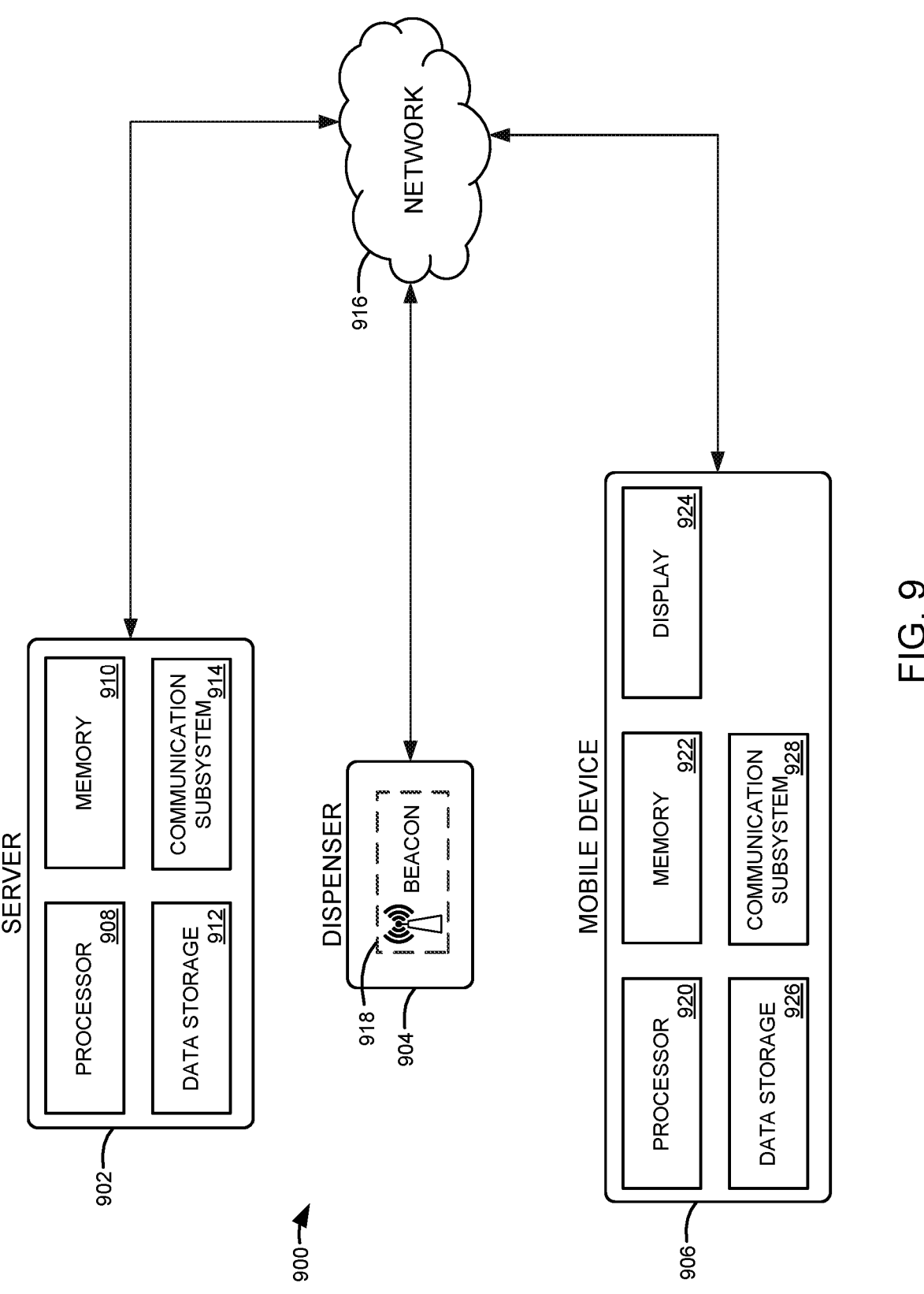
FIG. 9 is a simplified block diagram of an alternative embodiment of a dispenser control system for accommodating a person with disabilities.

The server 902 may be embodied as any type of computation or computer device capable of performing the functions described herein. As shown in FIG. 9, the server 902 includes a processor 908, a memory 910, a data storage device 912, and a communication subsystem 914. Of course, the server 902 may include other or additional components, such as those commonly found on servers, in other embodiments. Additionally, in some embodiments, one or more of the illustrative components may be incorporated in, or otherwise form a portion of, another component. For example, the memory 910, or portions thereof, may be incorporated in the processor 908 in some embodiments. The processor 908 may be embodied as any type of processor capable of performing the functions described herein, such as a single or multi-core processor, microcontroller, or other processor or processing/controlling circuit. The memory 910 may be embodied as any type of volatile or non-volatile memory or data storage capable of performing the functions described herein. In operation, the memory 910 may store various data and software used during operation of the server 902 such as applications, programs, libraries, and/or drivers. The memory 910 is communicatively coupled to the processor 908. Similarly, the data storage device 912 may be embodied as any type of device or devices configured for short-term or long-term storage of data such as, for example, memory devices and circuits, memory cards, hard disk drives, solid-state drives, non-volatile flash memory, or other data storage devices. The communication subsystem 914, which may be embodied as any communication circuit, device, or collection thereof, capable of enabling communications between the server 902 and other remote devices over the network 916, such as dispenser 904 and mobile device 906. The communication subsystem 914 may be configured to use any one or more communication technology (e.g., wired or wireless communications) and associated protocols (e.g., Ethernet, Wi-Fi®, WiMAX, 3G, 4G LTE, etc.) to effect such communication.

The dispenser 904 is configured to dispense a beverage in an electronically controlled manner, similar to dispenser 300, 400, 450, 500 described herein. Instead of, or in addition to the accessibility panel 308, 452, 514, the dispenser 904 includes a wireless beacon 918 in the embodiment shown. For example, the wireless beacon 918 may be a BluetoothTM beacon that wirelessly broadcasts certain information for accessing a user interface for controlling dispensing, such as a unique network address for the dispenser 904, which by way of example could be a QR code. Instead of scanning the QR code with a camera on the mobile device 906, the information embedded in the QR code would be wirelessly broadcasted by the beacon 918 and received by the communication subsystem 928 of the mobile device 906. Depending on the circumstances, the wireless beacon 918 could be a Near Field Communication (NFC) device that transmits the information or other wireless communication devices could be used. In some cases, the unique network address (e.g., QR code) could be dynamic based on updates from the server 902. For example, the server 902 may update the unique network address periodically and/or after each dispense and/or at other times. This provides a technical advantage of securing dispensing from the dispenser 904. Since the unique network address periodically changes, this prevents a user from reusing the unique network address for additional dispensing.

The mobile device 906 may be embodied as any type of computation or computer device capable of performing the functions described herein, such as a smart phone, tablet, notebook computer, etc. As shown in FIG. 9, the mobile device 906 includes a processor 920, a memory 922, a display 924, a data storage 926, and a communication subsystem 928. Of course, the mobile device 906 may include other or additional components, such as those commonly found on mobile devices, in other embodiments. The processor 920 may be embodied as any type of processor capable of performing the functions described herein, such as a single or multi-core processor, microcontroller, or other processor or processing/controlling circuit. The memory 922 may be embodied as any type of volatile or non-volatile memory or data storage capable of performing the functions described herein. In operation, the memory 922 may store various data and software used during operation of the mobile device 906 such as applications, programs, libraries, and/or drivers. The memory 922 is communicatively coupled to the processor 920. The display 924 may be any type of display capable of performing the functions described herein, such as a touchscreen, LED, OLED, LCD, or other type of display. The data storage device 926 may be embodied as any type of device or devices configured for short-term or long-term storage of data such as, for example, memory devices and circuits, memory cards, hard disk drives, solid-state drives, non-volatile flash memory, or other data storage devices. The communication subsystem 928, which may be embodied as any communication circuit, device, or collection thereof, capable of enabling communications between the mobile device 906 and other remote devices over the network 916, such as the server 902. The communication subsystem 928 may be configured to use any one or more communication technology (e.g., wired or wireless communications) and associated protocols (e.g., Ethernet, Wi-Fi®, WiMAX, 3G, 4G LTE, Bluetooth™, NFC, etc.) to effect such communication.

Referring now to FIG. 10, in an illustrative embodiment, the server 902 establishes an environment 1000 during operation to facilitate cloud-based pairing between a dispenser 904 and a mobile device 906 so that the mobile device 906 can facilitate beverage selection and control dispensing of beverages through the dispenser 904 without touching any external surface of the dispenser 904. The illustrative environment 1000 includes a pairing engine 1002, a parameter manager 1004, and a beverage parameters data store 1006. As shown, the various components of the environment 1000 may be embodied as hardware, firmware, software, or a combination thereof. As such, in some embodiments, one or more of the components of the environment 1000 may be embodied as circuitry or collection of electrical devices (e.g., pairing engine circuitry, parameter manager circuitry, and beverage parameter data store circuitry). It should be appreciated that, in such embodiments, one or more of the pairing engine 1002, parameter manager 1004, and/or beverage parameters data store 1006 may form a portion of the processor 908, the memory 910, and/or other components of the server 902. Additionally, in some embodiments, one or more of the illustrative components may form a portion of another component and/or one or more of the illustrative components may be independent of one another.

The pairing engine 1002 is configured to receive a request from a mobile device 906 over the network 916 to control a dispenser 904. Typically, the mobile device 906 sends this request in response to receiving information embedded in a QR code being broadcast by the wireless beacon 918 of the dispenser 904. For example, the QR code could embed the serial number or other identifier of the dispenser 100, and this identifier could be included in the request from the mobile device 106 based on the broadcast from the wireless beacon 918. By way of example, the QR code could embed a URL to a web page specific to the dispenser 904. The pairing engine 1002 is configured to parse the request and return an interface, which could be embodied as a web page, from which the user of the mobile device 906 can make beverage selections and control dispensing of the beverage from the selected dispenser 904. Typically, the interface is customized based on availability of active recipes (or other parameters) for the dispenser 904. For example, the pairing engine 1002 could retrieve available recipes (and/or other parameters) for the dispenser 904 identified in the request from the parameter manager 1004. This allows an interface customized specific to the specific dispenser 904 for which the mobile device 906 requests pairing.

The parameter manager 1004 is configured to return available recipes (or other parameters) for an identified dispenser 904. For example, the beverage parameters data store 1006 may include data indicating what recipes are active (and/or other parameters) for a plurality of dispensers. The term "recipe" is broadly intended to include any instructions and parameters needed to make a beverage. The data in the beverage parameters data store 1006 could be maintained on a periodic, such as a daily or hourly basis, based on periodic reports received from the plurality of dispensers via the network 916, which provides an up-to-date list of active recipes (and/or other parameters) for the plurality of dispensers. The parameter manager 1004 is able to determine available recipes (and/or other parameters) as a function of an identifier of a dispenser, and pass this information to the pairing engine 1002 so the interface provided to the mobile device 906 has active recipes (and/or other parameters) specific to the requested dispenser 904.

Referring now to FIG. 11, in an illustrative embodiment, the mobile device 906 establishes an environment 1100 during operation to facilitate pairing of the mobile device 906 and the dispenser 904 to allow touchless control by the mobile device 906. The illustrative environment 1100 includes a dispenser pairing manager 1102 and a browser 1104. As shown, the various components of the environment 1100 may be embodied as hardware, firmware, software, or a combination thereof. In some embodiments, the dispenser pairing manager 1102 is configured to listen for the broadcast by the wireless beacon 918 of the dispenser 904, such as using the mobile device's communication subsystem 928. As such, in some embodiments, one or more of the components of the environment 1100 may be embodied as circuitry or collection of electrical devices. By way of example, the dispenser pairing manager 1102 may be embodied as an app on the mobile device 906 that, upon launch, starts to listen for the broadcast by the wireless beacon 918. When the broadcast is received, the dispenser pairing manager 1102 could be configured to launch the browser 1104 to load a webpage based on the unique network identifier being broadcast by the wireless beacon 918. It should be appreciated that, in such embodiments, one or more of the dispenser pairing manager 1102 and browser may form a portion of the processor 920, the memory 922, and/or other components of the mobile device 906. Additionally, in some embodiments, one or more of the illustrative components may form a portion of another component and/or one or more of the illustrative components may be independent of one another.

The browser 1104 is configured to navigate the webpage based on the unique network identifier broadcast by the wireless beacon 918 and present the interface on that webpage to the user. For example, the browser 1104 could be embodied as the Safari™ browser by Apple Corp. of Cupertino, Calif. In some embodiments, the interface could be presented on an app of the mobile device 906 instead of using a browser 1104. The user may interact with the interface on the webpage to make a beverage selection (or customize the beverage), such as by using accessibility features built into the mobile device and/or third party accessibility features. Upon making the selections, the interface on the web page may include a confirmation interface element, which sends the selections to the server 902. As discussed herein, the server 902 then sends the selections to the dispenser 904, which generates a dispense code that is played audibly on a speaker of the dispenser. Upon making selections, the browser 1104 presents an interface on the webpage from which the user may enter the dispense code via the mobile device 106. In some cases, the dispenser pairing manager 1102 may enter the dispense code automatically. Upon entering the dispense code on the mobile device 906, the browser 1104 sends the dispense code to the server 902, which sends a message to the dispenser 904. In some embodiments, the server 902 and/or mobile device 906 may include a payment processing system for processing payment information prior to sending the dispense code. For example, one or more of the beverage selections may be associated with a price and the server 902 may include accounts with pre-existing credit card and/or debit card information associated with users of mobile devices 906 that could be applied for payment prior to sending a dispense code. This allows the dispenser 904 to charge for beverages without needing a local payment mechanism, such as a credit card terminal. Once the payment is processed, if necessary, and the dispense code is sent, a comparison is made to verify the dispense code entered on the mobile device 906 matches the dispense code generated by the dispenser 904. If so, the dispenser 904 dispenses the beverage based on the selections made by the user on the mobile device 906.

Referring now to FIG. 12, in use, the server 902 may execute a method 1200 for facilitating touchless control of the dispenser 904 by a visually-impaired user with the mobile device 906. The method 1200 begins in block 1202, in which the server 902 receives a request for a user interface in response to the mobile device 906 receiving the unique network identifier based on the broadcast of the wireless beacon 918 of the dispenser 904. For example, the server 902 may receive a request for a URL that identifies the dispenser 904 for which the mobile device 906 would like to control based on the wireless beacon's 918 broadcast data. The method 1200 advances to block 1204 in which the server 902 determines the dispenser 904 identified in the message received from the mobile device 906. For example, the dispenser 904 could be identified by serial number or other identifier in the broadcast data of the wireless beacon 918. The server 902 then determines the active recipes available (and/or other parameters) for the identified dispenser based on data in the beverage parameters data store

1006 (block 1206) and generates a webpage (or other interface) that is customized based on the available recipes for the identified dispenser found in the beverage parameters data store 1006 (block 1208), which is sent to the browser 1104 on the mobile device 906. The method 1200 then advances to block 1210 in which selections from the user interface is received from the mobile device 906. As discussed herein, the interface may include an element that can be selected by the user to indicate that selections have been completed (block 1212), which sends the selections to the server 902. The method 1200 then advances to block 1214 in which the server 902 sends the selections to the identified dispenser 904. Next, the server 902 receives a code sequence entered on the user interface of the mobile device 906 (block 1216) and sends the received code to the identified dispenser (block 1218).

Referring now to FIG. 13, in use, the dispenser 904 may execute a method 1300 for touchless control by a mobile device, which allows a visually-impaired user to make selections and dispense a beverage without touching the dispenser 904. In the embodiment shown, the method 1300 begins in block 1302, in which the dispenser 904 transmits a broadcast via the wireless beacon 918, which could be data embedded in a QR code in some embodiments. As discussed herein, the QR code embeds an identifier of the dispenser 904. The method 1300 advances to block 1304 in which the dispenser 904 receives a message with beverage selections from the server 902. Next, the dispenser 904 generates a dispense code (block 1306), which could be a random alphanumeric sequence. The method 1300 advances to block 1308 in which the dispense code could be audibly presented to the visually-impaired user by the dispenser 904. In some cases, the dispense code could be automatically entered by the mobile device 906 (block 1310). Next, the method 1300 advances to block 1312 in which the dispenser 904 receives a code from the server 902, which was entered on the mobile device 906. A comparison is made of the dispense code generated by the dispenser 904 and the code entered into the mobile device 906 (block 1314). If the codes match, the method 1300 advances to block 1316, and the dispenser 904 dispenses the beverage. In some cases, the dispenser 904 may wait to dispense the beverage unless sensing the vessel is in position (block 1318), such as with a proximity sensor. If the codes do not match, the method 1300 advances to block 1320 in which the dispenser 904 presents an audible error message, and does not dispense any beverage.

Referring now to FIG. 14, in use, the mobile device 906 may execute a method 1400 for touchless control of the dispenser 904 by a visually-impaired user. The method 1400 begins in block 1402, in which the user uses the mobile device 906 to open the app that starts to listen for the broadcast message by the wireless beacon 918 of the dispenser 904. When the mobile device 906 comes within a reference wireless communication range of the wireless beacon 918, the mobile device 906 will automatically request access to a webpage based on the beacon broadcast (block 1404). This action directs the mobile device's browser 1104 to a URL corresponding to the QR code being broadcast by the wireless beacon 918, which sends a request to the server 902 to access the web page based on the QR code. The browser then presents the web page with the user interface on the mobile device's display 924 (block 1406). The method 1400 then advances to block 1408 in which one or more selections are received from the user interface. These selections on the user interface are sent from the mobile device 906 to the server 902 (block 1410). Upon receiving these selections, the server 902 sends the selections to the dispenser 904, which then presents a dispense code audibly to the visually-impaired user. In some cases, the user then types this dispense code into the mobile device 906 via the user interface on the web page (block 1412). Depending on the circumstances, the dispense code could be automatically entered into the mobile device. This code is sent to the server 902 (block 1414), which then sends the code to the dispenser 904 for verification. As discussed herein, if the dispenser 904 verifies the code entered into the mobile device 906 matches the dispense code generated by the dispenser 904, the beverage is dispensed.

Figure 15:
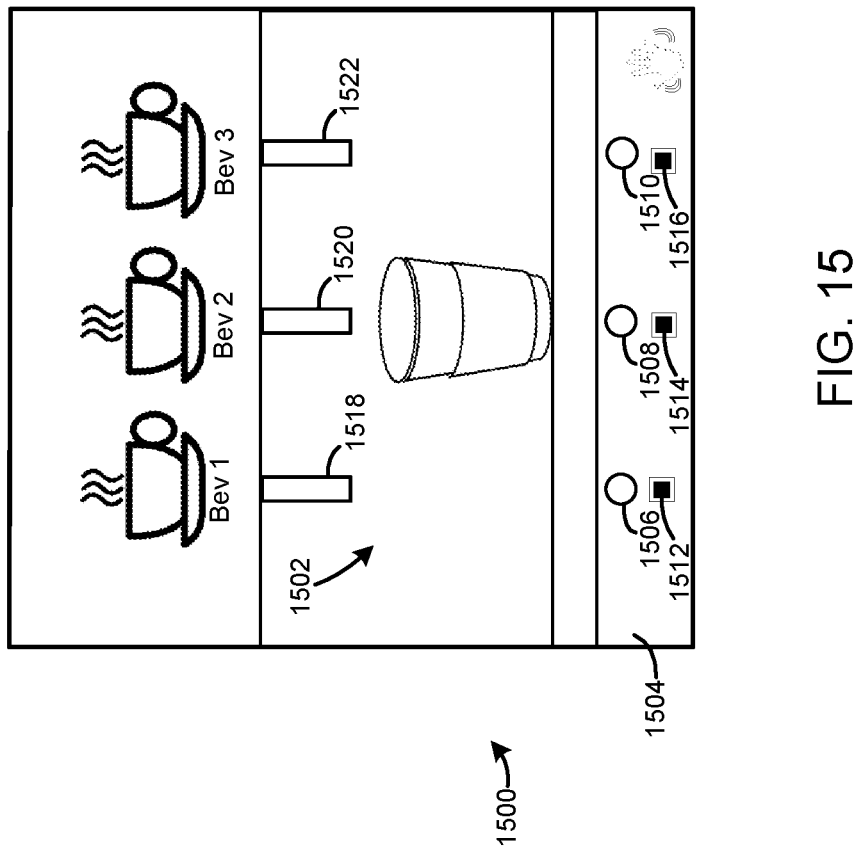
FIG. 15 is a simplified illustration of various embodiments of a dispenser with a touchless dispensing control feature.

FIG. 15 illustrates a dispenser 1500 that is similar to the dispenser 450 shown in FIG. 4B, with a dispensing area 1502, and an accessibility panel 1504 with a touchless control feature. In some embodiments, the accessibility panel 1504 could be retrofit with existing dispensers to add touchless control. Typically, the accessibility panel would be placed at a level that complies with the Americans with Disabilities Act (ADA) so the touchless controls are within reach of persons with disabilities, such as a person in a wheelchair.

As shown, the accessibility panel 1504 includes a first touchless sensor 1506 corresponding to "Bev 1," a second touchless sensor 1508 corresponding to "Bev 2," and a third touchless sensor 1510 corresponding to "Bev 3." Depending on the circumstances, the proximity sensors 1506, 1508, 1510 could be an optical sensor, such as an IR sensor, or another type of sensor that could detect a user's hand and/or finger within a reference range of the sensor without needing to touch the sensor. In some embodiments, a first light source 1512 corresponds with the first touchless sensor 1506, a second light source 1514 corresponds with the second touchless sensor 1508, and a third light source 1516 corresponds with the third touchless sensor 1510. The light sources could be LEDs, a screen or other type of interface that allows the dispenser 1500 to display operational status information. The dispenser 1500 includes three beverages for purposes of example, but the dispenser 1500 could have more or less beverages (or other products) depending on the circumstances.

As shown, the dispenser 1500 includes a first spout 1518 configured to dispense "Bev 1," a second spout 1520 configured to dispense "Bev 2," and a third spout 1522 configured to dispense "Bev 3." In the embodiment shown, the proximity sensors 1506, 1508, 1510 and/or light sources 1512, 1514, 1516 on the accessibility panel 1504 are arranged to correspond with the spacing of the spouts 1518, 1520, 1522 to show an association with those beverages to the user. Of course, there may be other ways, such as labeling near the proximity sensors 1506, 1508, 1510 and/or light sources 1512, 1514, 1516, to indicate what corresponds with which beverages.

In some embodiments, the user would place a vessel in the dispensing area 1502 under the spout 1518, 1520, 1522 of the desired beverage. The user would then place their hand or finger(s) in front of the sensor 1506, 1508, or 1510 corresponding to the beverage selection. While the user's hand and/or finger(s) are placed in front to the sensor 1506, 1508, or 1510 without actually touching the sensor, the dispenser 1500 could wait to dispense the selected beverage (or other product) until the light source 1512, 1514, or 1516 corresponding with the selected sensor 1506, 1508, or 1510 indicates a selection confirmation action for a predetermined time period (e.g., flashes several times). The light source 1512, 1514, or 1516 corresponding with the selected sensor 1506, 1508, or 1510 could then indicate a dispensing action by the dispenser 1500, which could be a solid light that continues while the hand or finger(s) remain in front of the sensor 1506, 1508, or 1510 in some embodiments.

If the user removes their hand or finger(s) from range of the sensor 1506, 1508, or 1510, the dispenser 1500 could immediately stop dispensing the selected beverage (or other product); however, in some embodiments, the dispenser 1500 could enter into a "topping off" state for a predetermined time period that allows additional dispensing in which the dispenser 1500 will immediately dispense to "top off" the beverage whenever the user's hand or finger(s) are within range without pausing for the selection confirmation action (e.g., flash several times) discussed above. In some cases, the "topping off" state could be indicated by the light source 1512, 1514, or 1516 corresponding to the sensor 1512, 1514, or 1516 remaining illuminated until the predetermined time period for "topping off" has passed and then the light source 1512, 1514, or 1516 will turn off. Once the light source 1512, 1514, or 1516 has turned off, the dispenser 1500 could require the selection confirmation sequence (e.g., flash several times) discussed above before initiating dispensing.

Consider an example in which the user would like to dispense "Bev 2." The user would place a cup or other vessel under spout 1520, which corresponds to "Bev 2" in this example. The user would then place a hand and/or finger(s) in within the reference range of sensor 1508, which corresponds with dispensing the "Bev 2." Prior to actually dispensing "Bev 2," the dispenser 1500 may perform a selection confirmation action, such as by flashing light source 1514, which corresponds with "Bev 2" for a predetermined time period. If the user continues to place their hand and/or finger(s) in front of the sensor 1508 after the selection confirmation action, the dispenser 1500 would start to dispense "Bev 2" while the user's hand and/or finger(s) continue to be within a reference range of the sensor 1508. When the user moves their hand and/or finger(s) outside the range of the sensor 1508, the dispenser 1500 would immediately stop dispensing "Bev 2." In some embodiments, the light source 1514 could remain illuminated to indicate a "topping off" state even though dispensing has stopped. During the "topping off" state, the user could immediately start dispensing again by placing their hand and/or finger(s) in front of the sensor 1508. After the predetermined time period for "topping off" has passed, which could be restarted each time the user initiates dispensing, the light source 1514 could turn off. At that point, the user could need to wait for the selection confirmation action (e.g., flashing light) prior to further dispensing.

EXAMPLES

Illustrative examples of the touchless dispensing technologies disclosed herein are provided below. An embodiment of the technologies may include any one or more, and any combination of, the examples described below.

Example 1 is a dispenser with a dispensing subsystem, a user interface, a processor and memory. The dispensing subsystem is configured to selectively dispense a product. The user interface is configured to present one or more product options for selection. The processor is configured to control the user interface and the dispensing subsystem. The non-transitory, computer-readable storage media includes a plurality of instructions stored thereon that, in response to being executed, cause the processor to: establish a first mode of controlling selection and dispensing of products, wherein in the first mode, the user interface is configured to receive one or more product selection options and initiate dispensing of one or more products through physical interaction with one or more external surfaces of the dispenser; in response to detecting a touchless activation input, establish a second mode of controlling selection and dispensing of products, wherein in the second mode, the user interface is configured to detect one or more product selection options and initiate dispensing of one or more products through touchless interaction with a touchless sensor of the dispenser; and switch from the second mode to the first mode in response to one or more of: (1) dispensing a product in the second mode; or (2) a predetermined time period elapsing.

Example 2 includes the subject matter of Example 1, and wherein: the touchless sensor is a gesture recognition sensor.

Example 3 includes the subject matter of Examples 1-2, and wherein: to detect the touchless activation input comprises detecting an activation gesture based on the gesture recognition sensor.

Example 4 includes the subject matter of Examples 1-3, and wherein: in the second mode, the touchless interaction with the touchless sensor comprises recognizing a plurality of gestures with the gesture recognition sensor to navigate through one or more product selections on the user interface and dispense a selected product.

Example 5 includes the subject matter of Examples 1-4, and wherein: in the second mode, at least a portion of the plurality of gestures are mapped to corresponding functions of physical buttons on the dispenser.

Example 6 includes the subject matter of Examples 1-5, and wherein: in the second mode, at least one gesture is mapped with a next button to move selection of a product option on the user interface of the dispenser to a next product option on the user interface.

Example 7 includes the subject matter of Examples 1-6, and wherein: in the second mode, at least one gesture is mapped with a previous button to move selection of a product option on the user interface of the dispenser to a previous product option on the user interface.

Example 8 includes the subject matter of Examples 1-7, and wherein: in the second mode, at least one gesture is mapped with an enter button to initiate dispensing of a selected product on the user interface.

Example 9 includes an accessibility panel for retrofitting with a dispenser with gesture control. The accessibility panel includes a gesture recognition sensor configured to detect a plurality gestures within range of the gesture recognition sensor. The accessibility panel also includes an input command subsystem configured to translate the plurality of gestures into respective input commands to navigate selection of a product from the dispenser.

Example 10 includes the subject matter of Example 9, and further comprising a plurality of physical buttons, wherein at least a portion of the plurality of physical buttons are associated with respective input commands, wherein the plurality of gestures includes a first gesture, a second gesture and a third gesture and wherein the input command subsystem is configured to translate the first gesture into a first input command corresponding to a first physical button of the plurality of buttons.

Example 11 includes the subject matter of Examples 9-10, and wherein: the input command subsystem is configured to translate the second gesture into a second input command corresponding to a second physical button of the plurality of buttons.

Example 12 includes the subject matter of Examples 9-11, and wherein: the input command subsystem is configured to translate the third gesture into a third input command corresponding to a third physical button of the plurality of buttons.

Example 13 includes the subject matter of Examples 9-12, and wherein: the first button corresponds with a next button command indicating that a next product on a user interface should be selected, and the input command subsystem is configured to translate the first gesture into the next button command.

Example 14 includes the subject matter of Examples 9-13, and wherein: the second button corresponds with a previous button command indicating that a previous product on a user interface should be selected, and the input command subsystem is configured to translate the second gesture into the previous button command.

Example 15 includes the subject matter of Examples 9-14, and wherein: the third button corresponds with an accessibility mode command indicating that an accessibility mode should be entered, and the input command subsystem is configured to translate the third gesture into the accessibility mode command.

Example 16 includes a method of dispensing a product. The method includes the step of establishing a first mode of controlling selection and dispensing of products on a dispenser, wherein in the first mode, a user interface on the dispenser is configured to receive one or more product selection options and initiate dispensing of one or more products through physical interaction with one or more external surfaces of the dispenser. There is also the step of establishing a second mode of controlling selection and dispensing of products in response to detecting a touchless activation input with a gesture recognition sensor of the dispenser, wherein in the second mode, the user interface is configured to detect one or more product selection options and initiate dispensing of one or more products through gesture interaction with the gesture recognition sensor of the dispenser. The method also includes switching from the second mode to the first mode in response to one or more of: (1) dispensing a product in the second mode; or (2) a predetermined time period elapsing.

Example 17 includes the subject matter of Example 16, and wherein: in the second mode, the gesture interaction with the gesture recognition sensor comprises recognizing a plurality of gestures with the gesture recognition sensor to navigate through one or more product selections and dispensing a selected product on the dispenser.

Example 18 includes the subject matter of Examples 16-17, and wherein: in the second mode, at least a portion of the plurality of gestures are mapped to corresponding functions of physical buttons on the dispenser.

Example 19 includes the subject matter of Examples 16-18, and wherein: in the second mode, at least one gesture is mapped with a next button to move selection of a product option on the user interface of the dispenser to a next product option on the user interface.

Example 20 includes the subject matter of Examples 16-19, and wherein: in the second mode, at least one gesture is mapped with a previous button to move selection of a product option on the user interface of the dispenser to a previous product option on the user interface.

Example 21 includes the subject matter of Examples 16-20, and wherein: in the second mode, at least one gesture is mapped with an enter button to initiate dispensing of a selected product on the user interface Example 22 is a network-controlled dispensing device for a visually-impaired user. The network-controlled dispensing device includes a wireless beacon and a controller. The wireless beacon wirelessly broadcasts an identifier that uniquely identifies the dispensing device to a mobile computing device within a reference range of the wireless beacon. The controller is to control dispensing of a product based on one or more product selections received from a server. The controller generates a dispense code in response to receiving one or more product selections from the server and audibly presents the dispense code via a speaker. The controller is to dispense a product based on the one or more product selections received from the server in response to receiving a code from the server that matches the dispense code.

Example 23 includes the subject matter of Example 22, and wherein: the identifier broadcast by the wireless beacon encodes a network address that includes a unique identifier that identifies the dispensing device.

Example 24 includes the subject matter of Examples 22-23, and wherein: the identifier broadcast by the wireless beacon comprises a QR code data that is unique to the dispensing device.

Example 25 includes the subject matter of Examples 22-24, and wherein: the QR code data encodes a URL that is unique to the dispensing device.

Example 26 includes the subject matter of Examples 22-25, and wherein: the dispense code is a random alphanumeric sequence.

Example 27 includes the subject matter of Examples 22-26, and wherein: the controller is to audibly present an error message via a speaker of the dispensing device in response to the code received from the server not matching the dispense code.

Example 28 includes the subject matter of Examples 22-27, and wherein: the controller is configured to control brewing of a brewed beverage based on one or more beverage parameters received from the server, wherein the controller is configured to initiate brewing of the brewed beverage in response to receiving a code from the server that matches the dispense code.

The invention claimed is:

1. A dispenser comprising:
  a dispensing circuitry configured to selectively dispense a product;
  a user interface configured to present one or more product options for selection on a display;
  a processor configured to control the user interface and the dispensing circuitry;
  a non-transitory, computer-readable storage media comprising a plurality of instructions stored thereon that, in response to being executed, cause the processor to:
    establish a first mode of controlling selection and dispensing of products, wherein in the first mode, the user interface is configured to receive one or more product selection options and initiate dispensing of one or more products through physical interaction with one or more external surfaces of the dispenser;
    in response to detecting a touchless activation input, establish a second mode of controlling selection and dispensing of products, wherein in the second mode, the user interface is configured to detect one or more product selection options and initiate dispensing of one or more products through touchless interaction with a touchless sensor of the dispenser, wherein the touchless sensor is configured to detect touchless interactions within a sensing region spaced apart a distance below the display separate from a display interaction region such that initiation of touchless interactions does not require proximity to the display while the display is physically unreachable by a user initiating one or more touchless interactions; and
    switch from the second mode to the first mode in response to one or more of: (1) dispensing a product in the second mode; or (2) a predetermined time period elapsing.

2. The dispenser of claim 1, wherein the touchless sensor is a gesture recognition sensor.

3. The dispenser of claim 2, wherein to detect the touchless activation input comprises detecting an activation gesture based on the gesture recognition sensor.

4. The dispenser of claim 3, wherein in the second mode, the touchless interaction with the touchless sensor comprises recognizing a plurality of gestures with the gesture recognition sensor to navigate through one or more product selections on the user interface and dispense a selected product.

5. The dispenser of claim 4, wherein in the second mode, at least a portion of the plurality of gestures are mapped to corresponding functions of physical buttons on the dispenser.

6. A dispenser comprising:
  a dispensing circuitry configured to selectively dispense a product;
  a user interface configured to present one or more product options for selection;
  a processor configured to control the user interface and the dispensing circuitry;
  a non-transitory, computer-readable storage media comprising a plurality of instructions stored thereon that, in response to being executed, cause the processor to:
    establish a first mode of controlling selection and dispensing of products, wherein in the first mode, the user interface is configured to receive one or more product selection options and initiate dispensing of one or more products through physical interaction with one or more external surfaces of the dispenser;
    in response to detecting a touchless activation input, establish a second mode of controlling selection and dispensing of products, wherein in the second mode, the user interface is configured to detect one or more product selection options and initiate dispensing of one or more products through touchless interaction with a touchless sensor of the dispenser, wherein the touchless sensor is a gesture recognition sensor, wherein to detect the touchless activation input comprises detecting an activation gesture based on the gesture recognition sensor, wherein in the second mode, the touchless interaction with the touchless sensor comprises recognizing a plurality of gestures with the gesture recognition sensor to navigate through one or more product selections on the user interface and dispense a selected product, wherein in the second mode, at least a portion of the plurality of gestures are mapped to corresponding functions of physical buttons on the dispenser, wherein in the second mode, at least one gesture is mapped with a next button to move selection of a product option on the user interface of the dispenser to a next product option on the user interface; and
    switch from the second mode to the first mode in response to one or more of: (1) dispensing a product in the second mode; or (2) a predetermined time period elapsing.

7. The dispenser of claim 6, wherein in the second mode, at least one gesture is mapped with a previous button to move selection of a product option on the user interface of the dispenser to a previous product option on the user interface.

8. The dispenser of claim 6, wherein in the second mode, at least one gesture is mapped with an enter button to initiate dispensing of a selected product on the user interface.

9. A method of dispensing a product, the method comprising:

establishing a first mode of controlling selection and dispensing of products on a dispenser, wherein in the first mode, a user interface on the dispenser is configured to receive one or more product selection options and initiate dispensing of one or more products through physical interaction with one or more external surfaces of the dispenser;

detecting a touchless activation input with a gesture recognition sensor of the dispenser;

in response to detecting the touchless activation input with the gesture recognition sensor of the dispenser, establishing a second mode of controlling selection and dispensing of products, wherein in the second mode, the user interface is configured to detect one or more product selection options and initiate dispensing of one or more products through gesture interaction with the gesture recognition sensor of the dispenser, wherein in the second mode, the gesture interaction with the gesture recognition sensor comprises recognizing a plurality of gestures with the gesture recognition sensor to navigate through one or more product selections and dispensing a selected product on the dispenser, wherein in the second mode, at least a portion of the plurality of gestures are mapped to corresponding functions of physical buttons on the dispenser, wherein in the second mode, at least one gesture is mapped with a next button to move selection of a product option on the user interface of the dispenser to a next product option on the user interface; and switching from the second mode to the first mode in response to one or more of: (1) dispensing a product in the second mode; or (2) a predetermined time period elapsing.

10. The method of claim 9, wherein in the second mode, at least one gesture is mapped with a previous button to move selection of a product option on the user interface of the dispenser to a previous product option on the user interface.

11. The method of claim 9, wherein in the second mode, at least one gesture is mapped with an enter button to initiate dispensing of a selected product on the user interface.

* * * * *